United States Patent
Wang et al.

(10) Patent No.: US 11,393,306 B2
(45) Date of Patent: *Jul. 19, 2022

(54) INTRUDER DETECTION METHOD AND APPARATUS

(71) Applicant: Huawei Cloud Computing Technologies Co., Ltd., Gui'an New District, TX (US)

(72) Inventors: Xiaobo Wang, San Jose, CA (US); Honglei Wang, Shenzhen (CN); Zhijie Huo, Milpitas, CA (US); Xinmin Ding, San Jose, CA (US)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/025,770

(22) Filed: Sep. 18, 2020

(65) Prior Publication Data
US 2021/0005065 A1 Jan. 7, 2021

Related U.S. Application Data

(63) Continuation of application No. 16/457,198, filed on Jun. 28, 2019, now Pat. No. 10,783,759, which is a
(Continued)

(51) Int. Cl.
*G08B 13/00* (2006.01)
*G08B 15/00* (2006.01)
(Continued)

(52) U.S. Cl.
CPC .............. *G08B 13/00* (2013.01); *G06F 9/542* (2013.01); *G08B 15/00* (2013.01); *G08B 21/182* (2013.01); *G08B 21/22* (2013.01); *G08B 27/005* (2013.01)

(58) Field of Classification Search
CPC ....... G08B 13/00; G08B 21/182; G08B 21/22
See application file for complete search history.

(56) References Cited

U.S. PATENT DOCUMENTS

| 10,783,759 B2 | 9/2020 | Wang et al. |
| 2009/0268884 A1 | 10/2009 | Coleman et al. |
(Continued)

FOREIGN PATENT DOCUMENTS

| CN | 102724038 A | 10/2012 |
| CN | 104301286 A | 1/2015 |
(Continued)

OTHER PUBLICATIONS

"U.S. Appl. No. 16/457,198, Notice of Allowance dated May 18, 2020", 8 pgs.
(Continued)

*Primary Examiner* — Benyam Haile
(74) *Attorney, Agent, or Firm* — Schwegman Lundberg & Woessner, P.A.

(57) ABSTRACT

An intruder detection method is provided, comprising a security server sending a verification prompt to a device in a controlled-access area, based on an entry indication of an entrant into the controlled-access area, with the verification prompt indicating the entrant should perform a predefined verification action, the security server receiving entrant behavior information, the security server comparing the entrant behavior information to a behavior model of a set of authorized persons associated with the controlled-access area, with the behavior model including the verification prompt, and the security server generating an intruder indication if the entrant behavior information does not match a behavior sequence included in the behavior model.

20 Claims, 8 Drawing Sheets

Related U.S. Application Data continuation of application No. PCT/CN2018/093570, filed on Jun. 29, 2018.

(51) Int. Cl.
    *G06F 9/54*     (2006.01)
    *G08B 21/22*     (2006.01)
    *G08B 27/00*     (2006.01)
    *G08B 21/18*     (2006.01)

(56) References Cited

U.S. PATENT DOCUMENTS

| | | | |
|---|---|---|---|
| 2016/0335865 A1* | 11/2016 | Sayavong | G06F 16/951 |
| 2017/0103674 A1 | 4/2017 | Sadeh-koniecpol et al. | |
| 2020/0000561 A1 | 1/2020 | Wang et al. | |

FOREIGN PATENT DOCUMENTS

| | | |
|---|---|---|
| CN | 105429937 A | 3/2016 |
| CN | 106156578 A | 11/2016 |
| CN | 106803297 A | 6/2017 |
| CN | 106911668 A | 6/2017 |
| CN | 107590429 A | 1/2018 |
| CN | 107609369 A | 1/2018 |

OTHER PUBLICATIONS

"International Application No. PCT/CN2018/093570, International Search Report and Written Opinion dated Mar. 28, 2019", (Mar. 28, 2019), 9 pgs.

"Chinese Application No. 201880095205.9, First Office Action dated Jun. 2, 2021", (Jun. 2, 2021), 11 pgs. [partial translation of search document].

* cited by examiner

INTRUDER DETECTION METHOD AND APPARATUS

CROSS REFERENCE TO RELATED APPLICATION

This application is a continuation of and claims the benefit of priority to U.S. application Ser. No. 16/457,198, filed Jun. 28, 2019, which application is a continuation application of International Application No. PCT/CN2018/093570, filed Jun. 29, 2018, the contents of which are incorporated herein by reference in their entirety.

FIELD OF THE INVENTION

The present disclosure relates to smart home technology, and particularly to intruder detection in a smart home system.

BACKGROUND

Smart home technology is increasingly popular. With smart home technology, some or all devices in a home are connected to a smart home network. More and more devices in a home can be connected to the smart home network and used for intelligent home services and security, such as operating and/or communicating with home devices, including for example a coffee machine, door bell, voice gateway, smoke detector, oven, or other sensors or appliances.

Smart home security is in demand by customers of smart home systems. A home security system typically depends on information from an in-home security device or sensor to identify intruders, such as a camera with facial recognition capability, a fingerprint reader, a door lock that can be opened by a phone using Bluetooth or geo-location info (e.g., GPS), a WiFi transceiver or hub, a Bluetooth transceiver or hub, etc.

A home security system typically uses information from a single device or sensor within the home (such as a door sensor) to determine whether there is an intruder. However, the use of only a single device may have blind spots and may not be able to detect the intruder in all areas. In addition, a single device may generate false alarms because of environmental changes or variabilities. If a user wears a hat and glasses, or otherwise has a changed or altered appearance, a camera may only partially recognize or may even mis-identify a person. In addition, an intruder may use a picture or a 2D/3D mask to fool a camera or other recognition sensor.

SUMMARY

An intruder detection method is provided, comprising a security server sending a verification prompt to a device in a controlled-access area, based on an entry indication of an entrant into the controlled-access area, with the verification prompt indicating the entrant should perform a predefined verification action, the security server receiving entrant behavior information, the security server comparing the entrant behavior information to a behavior model of a set of authorized persons associated with the controlled-access area, with the behavior model including the verification prompt, and the security server generating an intruder indication if the entrant behavior information does not match a behavior sequence included in the behavior model. Through the solution provided, the security server may determine whether the entrant is allowed within the controlled-access area based on the entrant's subsequent behavior in response to the verification prompt. This improves verification accuracy.

In some method embodiments, the entry indication includes an entrant identity obtained during an entry event, with the method further comprising the preliminary steps of comparing the entrant identity to authorized person information of the set of authorized persons, and performing the sending, receiving, comparing, and generating steps if the entrant identity does not match the authorized person information. Through the solution provided, the security server performs the sending, receiving, comparing, and generating steps only if the entrant identity does not match the authorized person information. This may reduce processing in the security server if the entrant identity matches the authorized person information. As a result, resources of the security server are conserved.

In some method embodiments, the behavior model includes one or more behavior sequences for the set of authorized persons. As a result, the security server will have more choices in behavior sequences that are available for performing the intruder detection.

In some method embodiments, before sending the verification prompt, the method further comprises selecting the behavior sequence from a plurality of behavior sequences in the behavior model, with the selected behavior sequence corresponding to the predefined verification action. Through the solution provided, the security server selects a behavior sequence which corresponds to the predefined verification action. As a result, the security server may verify the entrant behavior more correctly.

In some method embodiments, before sending the verification prompt, the method further comprises comparing entry location information and entry time information in the entry indication to corresponding behavior parameters of each behavior sequence of a plurality of behavior sequences in the behavior model, generating a matching score for each behavior sequence, and selecting the behavior sequence having a highest matching score from a plurality of behavior sequences in the behavior model, with the selected behavior sequence corresponding to the predefined verification action. Through the solution provided, the selected behavior sequence having a highest matching score is used to match the entry indication. The use of the highest matching score may more correctly verify the entrant.

In some method embodiments, before sending the verification prompt, the method further comprises comparing entry location information and entry time information in the entry indication to corresponding behavior parameters of each behavior sequence of a plurality of behavior sequences in the behavior model, generating a matching score and a disturbance score for each behavior sequence, and selecting the behavior sequence corresponding to the highest matching score or to the highest disturbance score from at least two behavior sequences if the at least two behavior sequences share a highest matching score, with the selected behavior sequence corresponding to the predefined verification action. Through the above solution provided, the behavior sequence that has highest disturbance score is used for a verification process. The behavior sequence with the highest disturbance score may more correctly verify the entrant.

In some method embodiments, the receiving the entrant behavior information comprises receiving the entrant behavior information until encountering an end event in the entrant behavior information or until a verification period end, with the end event specified in the selected behavior sequence. Through the above solution provided, the security server stops receiving the entrant behavior information when an end event is found or at a verification period end. This may limit the entrant identity transmissions and conserve network resources.

In some method embodiments, the comparing the entrant behavior information to the behavior model comprises comparing the entrant behavior information to the behavior model and generating a behavior comparison value and generating the intruder indication when the behavior comparison value is smaller than an alarm threshold. Through the above solution, the intruder indication is generated based on the behavior comparison value, which provides a new solution verification based on a comparison of the entrant behavior.

In some method embodiments, before sending the verification prompt, the method further comprises accumulating authorized person behavior information during a learning phase, recognizing behavior patterns in the accumulated authorized person behavior, and generating one or more behavior sequences after the learning phase has been completed, with the one or more behavior sequences being generated based on the behavior patterns. Through the above solution, the security server generates behavior sequences before the verification process is performed, with the behavior sequences being based on the authorized person behavior. As a result, the verification may be more correctly and easily performed.

In some method embodiments, the accumulating the authorized person behavior actions during the learning phase comprises sending a behavior model prompt to the device, based on at least one behavior parameter specified in the behavior model, with the behavior model prompt indicating the authorized person to perform a specified authorized person action, and receiving authorized person behavior information in response to the behavior model prompt.

In some method embodiments, before sending the behavior model prompt, the method further comprises obtaining the at least one behavior model parameter for each sequence action of a plurality of sequence actions.

According to ninth implementation of first aspect or any one of the above implementations, the entry indication of the entrant comprises an entry initial evaluation value, the method further comprising, before sending the verification prompt, the security server further determining that the entry initial evaluation value is smaller than an intruder initial evaluation threshold. Through the above solution, the security server performs the verification only when the entry initial evaluation value is smaller than an intruder initial evaluation threshold, so the verification may be avoided when the entry initial evaluation value is larger. As a result, security server resources are conserved when the entry initial evaluation value is larger.

A security server is provided, comprising a non-transitory memory comprising instructions, and one or more processors in communications with the memory. The one or more processors execute the instructions to send a verification prompt to a device in a controlled-access area, based on an entry indication of an entrant into the controlled-access area, with the verification prompt indicating the entrant should perform a predefined verification action, receive entrant behavior information, compare the entrant behavior information to a behavior model of a set of authorized persons associated with the controlled-access area, with the behavior model including the verification prompt, and generate an intruder indication if the entrant behavior information does not match a behavior sequence included in the behavior model.

In some security server embodiments, the entry indication includes an entrant identity obtained during an entry event, with the method further comprising the preliminary steps of comparing the entrant identity to authorized person information of the set of authorized persons, and performing the sending, receiving, comparing, and generating steps if the entrant identity does not match the authorized person information.

In some security server embodiments, before sending the verification prompt, the method further comprises selecting the behavior sequence from a plurality of behavior sequences in the behavior model, with the selected behavior sequence corresponding to the predefined verification action.

In some security server embodiments, before sending the verification prompt, the method further comprises comparing entry location information and entry time information in the entry indication to corresponding behavior parameters of each behavior sequence of a plurality of behavior sequences in the behavior model, generating a matching score for each behavior sequence, and selecting the behavior sequence having a highest matching score from a plurality of behavior sequences in the behavior model, with the selected behavior sequence corresponding to the predefined verification action.

In some security server embodiments, before sending the verification prompt, the method further comprises comparing entry location information and entry time information in the entry indication to corresponding behavior parameters of each behavior sequence of a plurality of behavior sequences in the behavior model, generating a matching score and a disturbance score for each behavior sequence, and selecting the behavior sequence corresponding to the highest matching score or to the highest disturbance score from at least two behavior sequences if the at least two behavior sequences share a highest matching score, with the selected behavior sequence corresponding to the predefined verification action.

In some security server embodiments, the receiving the entrant behavior information comprises receiving the entrant behavior information until encountering an end event in the entrant behavior information or until a verification period end, with the end event specified in the selected behavior sequence.

In some security server embodiments, the comparing the entrant behavior information to the behavior model comprises comparing the entrant behavior information to the behavior model and generating a behavior comparison value, and generating the intruder indication when the behavior comparison value is smaller than an alarm threshold In some security server embodiments, before sending the verification prompt, the method further comprises accumulating authorized person behavior information during a learning phase, recognizing behavior patterns in the accumulated authorized person behavior, and generating one or more behavior sequences after the learning phase has been completed, with the one or more behavior sequences being generated based on the behavior patterns.

In some security server embodiments, wherein the accumulating the authorized person behavior actions during the learning phase comprises sending a behavior model prompt to the device, based on at least one behavior parameter specified in the behavior model, with the behavior model prompt indicating the authorized person to perform a specified authorized person action, and receiving authorized person behavior information in response to the behavior model prompt.

In some security server embodiments, before sending the behavior model prompt, the method further comprises obtaining the at least one behavior model parameter for each sequence action of a plurality of sequence actions.

Another intruder detection method performed by a detection server is provided. In the method, the detection server receives a verification prompt from a security server, with the verification prompt being based on an entry indication of an entrant into a controlled-access local area, with the verification prompt instructing the entrant to perform a verification action, sends the verification prompt to a device in the controlled-access area; receives entrant behavior information, with the entrant behavior information responding to the verification prompt; and sends the entrant behavior information to the security server for determining whether the entrant is an intruder. Through the above solution, the detection server receives the verification prompt and sends the entrant behavior information to the security server so the security server may use the entrant behavior information to perform the verification. Therefore, a new verification is provided based on behavior information of the entrant, which improves the verification process.

In some method embodiments, the method further sends the entry indication to the security server to trigger the security server performing the verification.

In some method embodiments, the entry indication comprises an entry initial evaluation value which may instruct the security server to perform the verification based on the entry initial evaluation value, simplifying the verification process performed by the security server.

In some method embodiments, the method further receives a behavior model prompt from the security server and sends the behavior model prompt to an authorized person within the controlled-access area, with the behavior model prompt instructing the authorized person to perform a predetermined behavior sequence in response to the behavior model prompt. Through the solution provided, the detection server may cooperate with the security server to build the behavior model.

In some method embodiments, the detection server further receives authorized person behavior information, with the authorized person behavior information being subscribed to by the security server. Consequently, the detection server sends authorized person behavior information to the security server. Through the solution provided, the detection server cooperates with the security server to build the behavior model.

A detection server is provided. The detection server may implement any function of the detection server described above. The function of the detection server may be realized via hardware or software. The hardware or software may include one or more modules corresponding to the functions described above. The one or more modules may include a receiving module, a sending module, and so on.

A detection server is provided. The security server may implement any function of the security server described above. The function of the security server may be realized via hardware or software. The hardware or software may include one or more modules corresponding to the functions described above. The one or more modules may include a communication module, a processing module, and so on.

In the detection server embodiments, the detection server includes a non-transitory memory comprising instructions and one or more processors in communication with the memory, wherein the one or more processors are configured to execute the instructions, wherein the security server may perform the solution described in the second aspect, or any implementation of the second aspect.

A computer storage medium in some embodiments stores the instructions for the server. The instructions include software or computer programs that, when executed by a processor or processors, realize the function of the detection server or security server, as described above.

The technical advantages achieved in the above embodiments may refer to the advantages of any implementation of the method embodiments, including the embodiments performed by the security server or the detection server.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Figure 1:
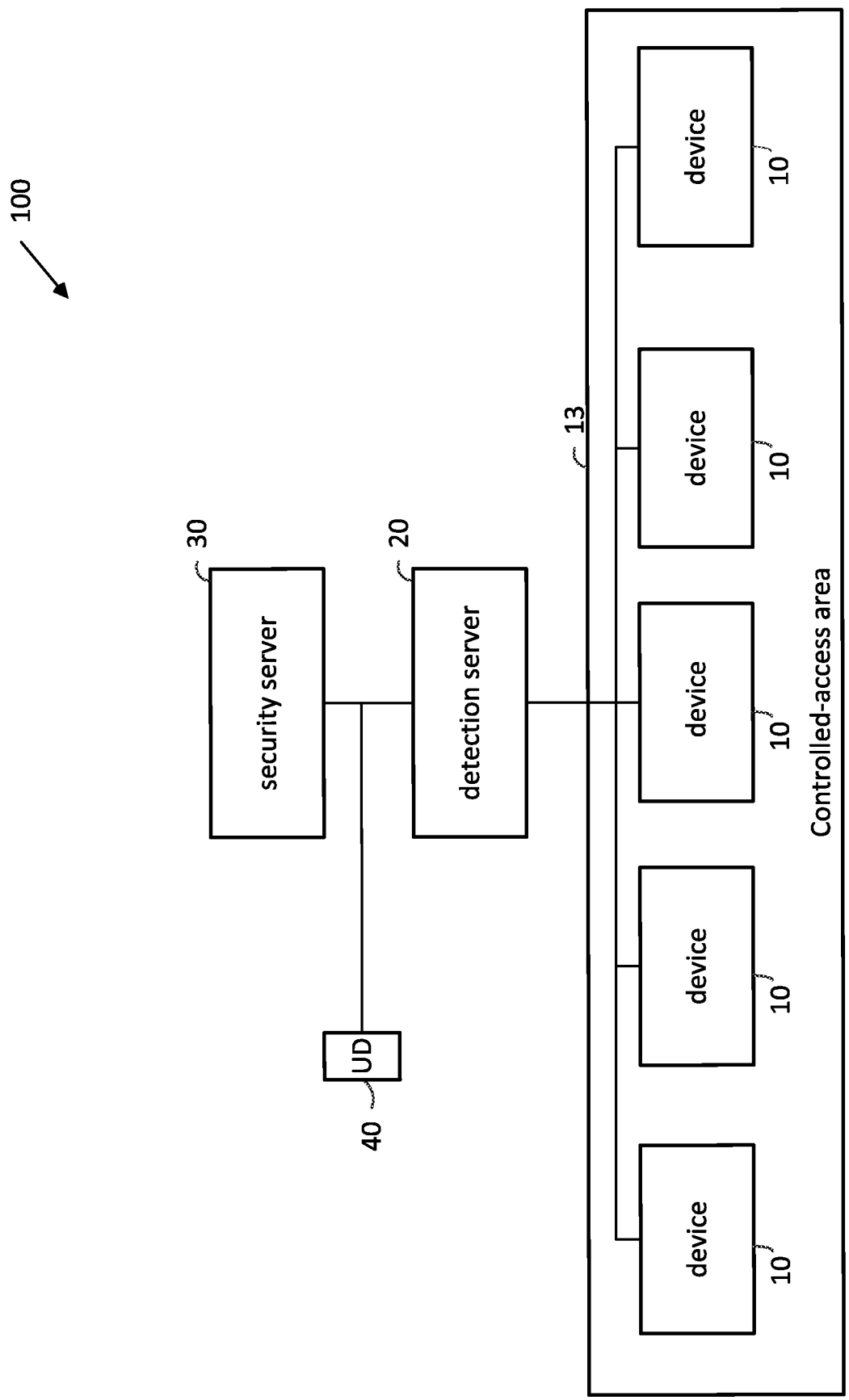
FIG. 1 is a diagram of an intruder detection system according to an embodiment.

FIG. 1 is a diagram of an intruder detection system 100 according to an embodiment. The intruder detection system 100 includes a plurality of devices 10 located in a controlled-access area 13. The intruder detection system 100 in the embodiment shown further includes a detection server 20, a security server 30, and a user device (UD) 40. The plurality of devices 10, the security server 30, and/or the UD 40 are connected to or in communication with the detection server 20, such as via a communication network (not shown). The communication network may comprise a wired or wireless telephone communication network an optical communication network, the Internet, or any other suitable communication network. The detection server 20 may communicate with the plurality of devices 10, the security server 30, and the UD 40, respectively. The UD 40 may communicate with the detection server 20 and the security server 130 via a same or different communication network (not shown). The communication network may comprise a wired or wireless telephone communication network an optical communication network, the Internet, or any other suitable communication network. The UD 40 can comprise a cellular phone, smartphone, pager, tablet, personal digital assistant (PDA), laptop or other computer, or other similar devices. This listing is not exhaustive.

The controlled-access area 13 may be a home, house, an office, a building of any manner, a fenced or bounded region, or any area having controlled access. The plurality of devices 10 may comprise a plurality of different devices and/or sensors in the controlled-access area 13. The plurality of devices 10 may include, for example, a phone, a smoke detector, a doorbell, a TV, a refrigerator, a light, a camera, and so on. This list is not exhaustive, and other electronic devices are contemplated for use in a home or other controlled-access area 13.

The plurality of devices 10 in the controlled-access area 13 may be directly controlled by an authorized person or persons. Alternatively, the plurality of devices 10 may be remotely accessed and controlled by the authorized person or persons, such as via a remote controller (not shown).

The detection server 20 exchanges communications with the plurality of devices 10. The detection server 20 may be located in the controlled-access area 13 or may be outside in the controlled-access area 13. The detection server 20 is configured in some embodiments to monitor messages and/or signals transmitted by the plurality of devices 10. The detection server 20 is configured to monitor the plurality of devices 10 and determine when a person (or persons) enters the controlled-access area 13. The detection server 20 may receive and interpret door or window-open messages or signals and determine that a person has entered the controlled-access area 13 (i.e., an entrant).

Further, the detection server 20 is configured to determine whether the entrant is authorized to enter the controlled-access area 13 or is an intruder. The detection server 20 is configured to generate an intruder indication if the detection server 20 determines that the entrant, i.e., the person entering the controlled-access area 13, is an intruder. The intruder indication can subsequently be used to generate an intruder indication display, set off an alarm, or perform other actions, including notifying law enforcement personnel.

The detection server 20 may comprise a server configured to perform the above actions and communicate with the controlled-access area 13 and with the plurality of devices 10. The detection server 20 may comprise one or more components or systems, including geographically distributed components or systems. The detection server 20 may comprise a network gateway device or system or may comprise any other suitable network component or system. The detection server 20 communicates with each of the plurality of devices 10 in a wired or wireless communication mode. The wireless communication mode includes, but is not limited to, infrared (IR), bluetooth communication, z-ware, near-field communication (NFC), zigbee communication, wifi communication, short message service (SMS) communication or other communication technologies. The wired communication mode includes, but is not limited to, wired internet communication, coaxial cable communication, telephone line communication, optical communications over an optical fiber or over free air, or other communication technologies.

The detection server 20 receives information from the plurality of devices 10, such as behavior information of a person in the controlled-access area 13 and sends the information to the security server 40 in some embodiments.

The detection server 20 stores one or more entrant verification algorithms and determines whether to generate an intruder indication. The detection server 20 further uses the one or more entrant verification algorithms to determine whether to send an entry indication to the security server 30.

The security server 30 communicates with the detection server 20 to perform security verification functions. The security server 30 may therefore be created to add to the security capabilities of the detection server 20. Alternatively, the security server 30 can be integrated into, and be a part of or subsystem in, the detection server 20. The security server 30 in an embodiment employs authorized person behavior information to distinguish whether an entrant (i.e., a person or persons entering the controlled-access area 13) is an authorized person or is an intruder. This entrant verification can be in place of, or in addition to, identification procedures of the system monitoring the controlled-access area 13.

The entrant verification performed by the security server 30 uses authorized person behavior information to verify the entrant. The entrant verification does not rely on entry of a user code by the entrant. The entrant verification does not rely on recognition or identification of the entrant's face or appearance. The entrant verification does not rely on biometric scanning of the entrant.

The security server 30 stores a behavior model including a plurality of behavior sequences. Each behavior sequence of the plurality of behavior sequences corresponds to at least one behavior parameter of the behavior model, such as an entry time, an entry location, a verification prompt to be sent to a device or devices within the controlled-access area 13, an end event parameter, a disturbance score parameter, a detectability score parameter, or behavior sequence parameter. The plurality of behavior sequences are used for intruder detection. The security server 30 may receive an entry indication from the detection server 20. The security server 30 determines whether to send an intruder indication to the UD 40 based on a selected behavior sequence of the plurality of behavior sequences, and on the received entrant behavior information.

The UD 40 may communicate with the detection server 20 and the security server 30. The UD 40 can amend the behavior parameters of the behavior model provided by a security provider. The UD 40 can receive the intruder indication from the detection server 20 and the security server 30.

Figure 2:
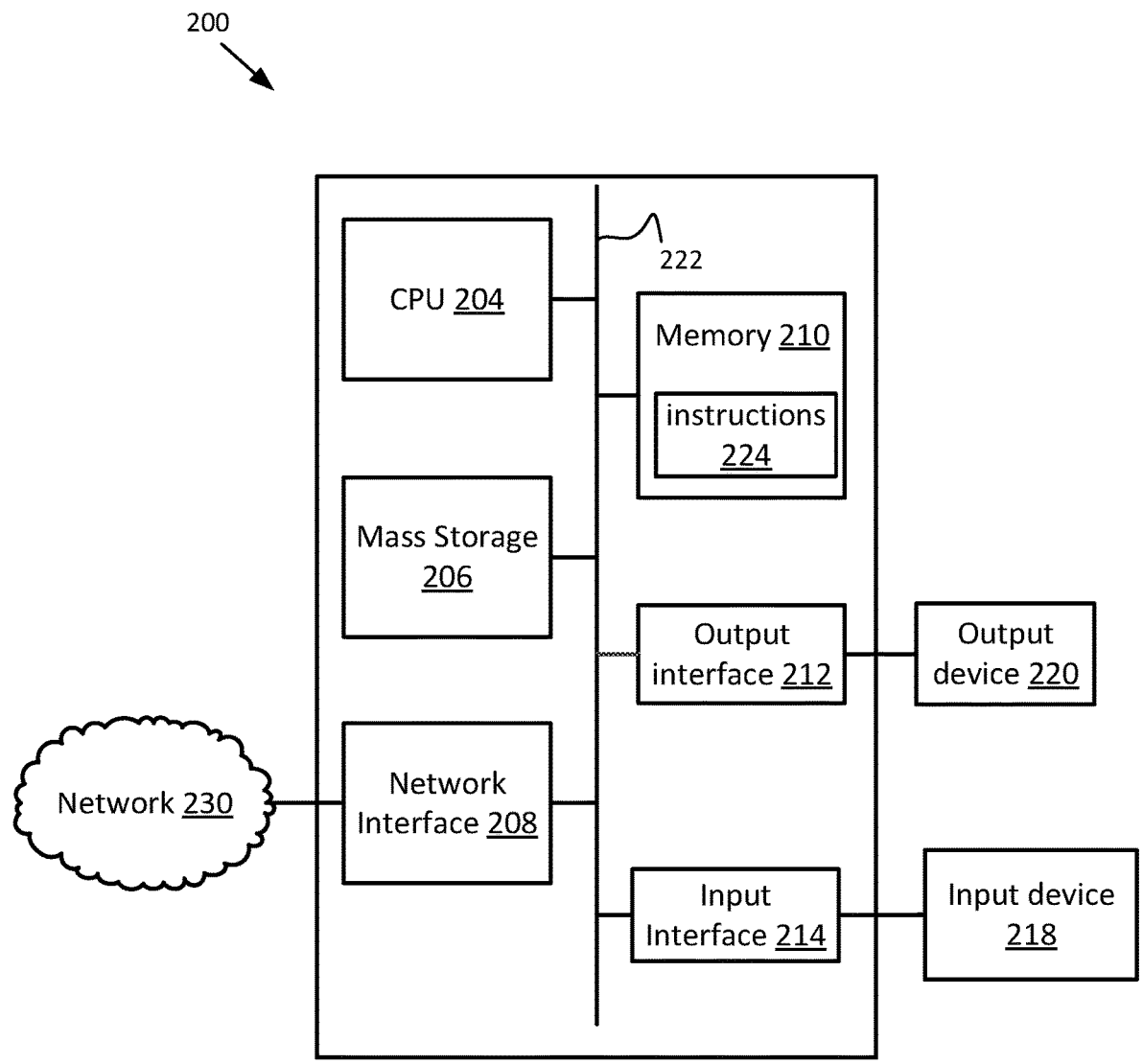
FIG. 2 is a diagram of an apparatus according to an embodiment.

FIG. 2 is a diagram of an apparatus 200 according to an embodiment. The apparatus 200 may comprise the UD 40, the detection server 20, or the security server 30. Alternatively, the apparatus 200 may perform the functions of the UD 40, the detection server 20, and/or the security server 30.

Specific devices may utilize all of the components shown, or only a subset of the components, and levels of integration may vary from device to device. Furthermore, a device may contain multiple instances of a component, such as multiple processors, memories, transmitters, receivers, etc.

The apparatus 200 may include a central processing unit (CPU) 204, a memory 210, a mass storage device 206, an output interface 212, and an input interface 214, all connected to a bus 222. The CPU 204 can communicate with the memory 210, the mass storage device 206, the output interface 212, and the input interface 214 via the bus 222.

The bus 222 may be one or more of any type of several bus architectures including a memory bus or memory controller, a peripheral bus, video bus, or the like. The CPU 204 may comprise any type of electronic data processor. The memory 210 may comprise any type of non-transitory memory such as static random access memory (SRAM), dynamic random access memory (DRAM), synchronous DRAM (SDRAM), read-only memory (ROM), a combination thereof, or the like. In an embodiment, the memory 210 may include ROM for use at boot-up, and DRAM for program and data storage for use while executing programs.

The memory 210 may store instructions 224. The instructions 224 comprise software or routines for execution by the CPU 204.

The mass storage device 206 may comprise any type of non-transitory storage device configured to store data, programs, or other information and to make the data, programs, and other information accessible via the bus 222. The mass storage device 206 may comprise, for example, one or more of a solid state drive, hard disk drive, a magnetic disk drive, an optical disk drive, or the like.

The output interface 212 and the input interface 214 provide interfaces to couple input devices 218 and output devices 220 to the apparatus 200. Example input devices 218 include a mouse, keyboard, touchscreen, microphone, keypad, and the like. Example output devices 220 include a display device, printer, speaker, touchscreen, and the like. Other devices may be coupled to the CPU 204, and additional or fewer interface devices may be utilized. For example, a serial interface such as Universal Serial Bus (USB) (not shown) may be used to provide an interface for a printer. It should be understood that alternatively the input interface 214 and the output interface 212 could be combined into a single I/O interface.

The apparatus 200 also includes one or more network interfaces 208 for communication with one or more external networks 230. An external network 230 may comprise wired links, such as an Ethernet cable or the like, and/or wireless links to access nodes. The network interface 208 allows the processing system 200 to communicate with remote units via the network(s) 230. For example, the network interface 208 may provide wireless communication via one or more transmitters/transmit antennas and one or more receivers/receive antennas. In an embodiment, the apparatus 200 is coupled to a local or wide-area network 230 for data processing and communications with remote devices, such as other processing units, the Internet, remote storage facilities, or the like.

An apparatus 200 (such as comprising a security server 30) in some embodiments comprises a non-transitory memory 210 comprising instructions 224, and one or more processors 204 in communications with the memory 210. The one or more processors 204 execute the instructions 224 to send a verification prompt to a device 10 in a controlled-access area 13, based on an entry indication of an entrant into the controlled-access area 13, with the verification prompt indicating the entrant should perform a predefined verification action, receive entrant behavior information, compare the entrant behavior information to a behavior model of a set of authorized persons associated with the controlled-access area 13, with the behavior model including the verification prompt, and generate an intruder indication if the entrant behavior information does not match a behavior sequence included in the behavior model.

In some apparatus embodiments, the apparatus generating generates an intruder indication if the entrant behavior information does not match a behavior sequence included in the behavior model within a predetermined verification period.

In some apparatus embodiments, the entry indication includes an entrant identity obtained during an entry event, with the apparatus preliminarily comparing the entrant identity to authorized person information of the set of authorized persons, and performing the sending, receiving, comparing, and generating if the entrant identity does not match the authorized person information.

In some apparatus embodiments, the behavior model includes one or more behavior sequences for the set of authorized persons. In some apparatus embodiments, the behavior model corresponds to one or both of the controlled-access area or the set of authorized persons.

In some apparatus embodiments, before sending the verification prompt, the apparatus selects the behavior sequence from a plurality of behavior sequences in the behavior model, with the selected behavior sequence corresponding to the predefined verification action.

In some apparatus embodiments, before sending the verification prompt, the apparatus compares entry location information and entry time information in the entry indication to corresponding behavior parameters of each behavior sequence of a plurality of behavior sequences in the behavior model, generates a matching score for each behavior sequence, and selects the behavior sequence having a highest matching score from a plurality of behavior sequences in the behavior model, with the selected behavior sequence corresponding to the predefined verification action.

In some apparatus embodiments, before sending the verification prompt, the apparatus compares entry location information and entry time information in the entry indication to corresponding behavior parameters of each behavior sequence of a plurality of behavior sequences in the behavior model, generates a matching score and a disturbance score for each behavior sequence, and selects the behavior sequence corresponding to the highest matching score or to the highest disturbance score from at least two behavior sequences if the at least two behavior sequences share a highest matching score, with the selected behavior sequence corresponding to the predefined verification action.

In some apparatus embodiments, the apparatus receives the entrant behavior information until encountering an end event in the entrant behavior information or until a verification period end, with the end event specified in the selected behavior sequence.

In some apparatus embodiments, the apparatus compares the entrant behavior information to the behavior model and generates a behavior comparison value and generates the intruder indication when the behavior comparison value is smaller than an alarm threshold.

In some apparatus embodiments, the entrant behavior information is received and compared to the behavior model from the entry indication until a verification period end. In other apparatus embodiments, the entrant behavior information is received and compared to the behavior model from the sending of the verification prompt until a verification period end.

Figure 3A:
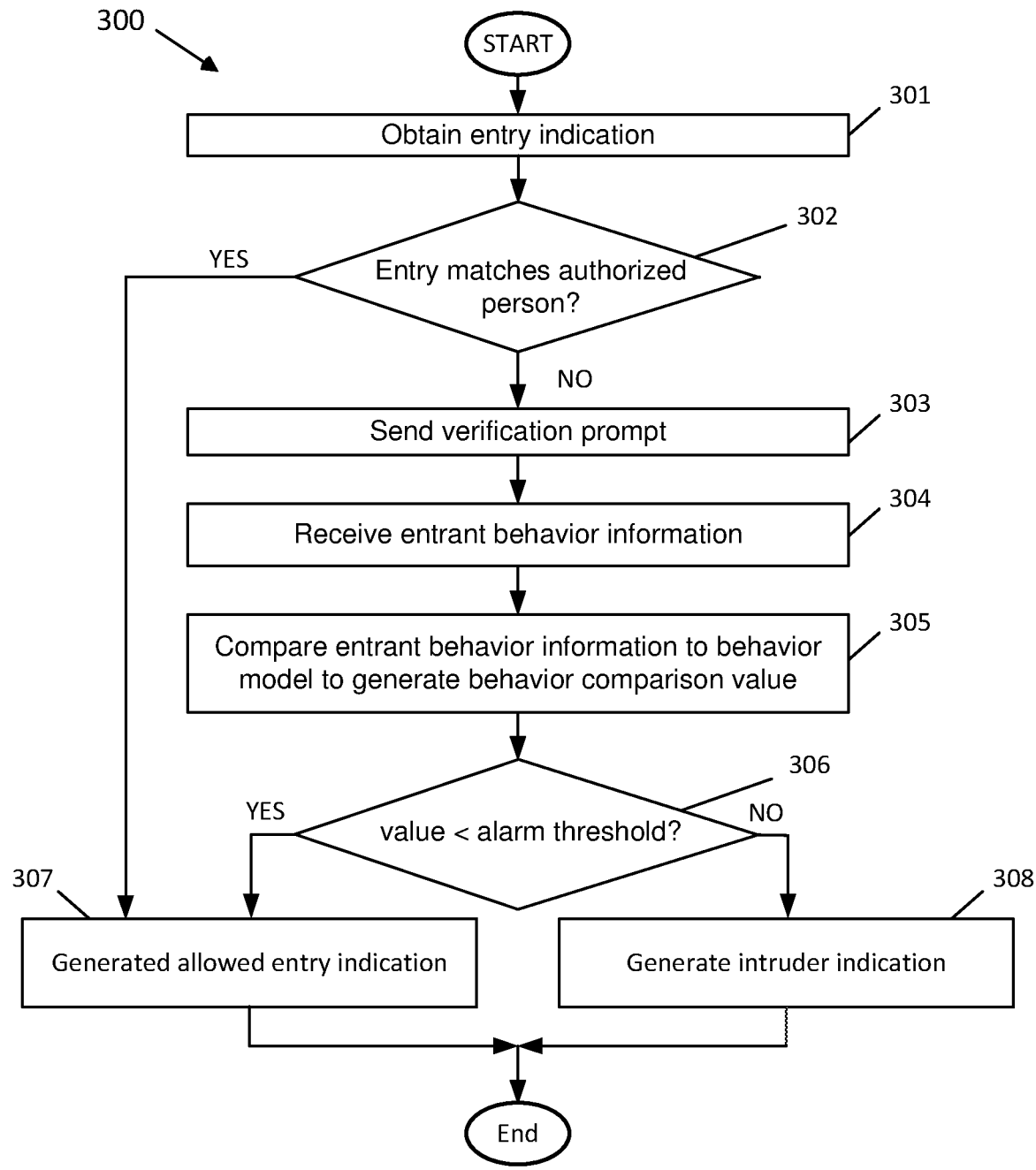
FIG. 3A is a flowchart of an intruder detection method according to an embodiment.

FIG. 3A is a flowchart of an intruder detection method 300 according to an embodiment. The method 300 may be carried out by a security server in some examples. The method 300 performs intruder detection by requiring an entrant to perform a verification process. The method 300 generates an intruder indication if the entrant does not perform the prompted verification process, if the entrant fails to correctly perform the prompted verification process, or if the verification process is not successfully completed within a predetermined time period (the verification fails if the complete verification process has not been performed before timeout of a verification timer). The verification process includes requiring the entrant to perform a predetermined sequence of actions to verify whether the entrant is authorized to enter the controlled-access area. The predetermined behavior sequence comprises normal and regular actions performed by an authorized person or persons in the controlled-access area. The method 300 determines whether the entrant is authorized or is an intruder by comparing the actions of the entrant, in response to the verification prompt, and determining if the entrant's behavior sufficiently matches the behavior of the authorized person or persons. The intruder indication can be used to perform additional security actions, including triggering alarms, locking doors, or notifying law enforcement personnel, among others.

In step 301, an entry indication is obtained. The entry indication typically indicates that a person or persons (i.e., the "entrant") has entered the controlled-access area. The entry indication includes entrant identity obtained during an entry event. The entrant identify may be the entrant's voice, entrant's face, entrant's fingerprint, and so on. Then entrant identity may be used to determine whether the entrant is an intruder before sending a verification prompt. The entry indication may also include one or more of entry action information, entry location information, entry time information, entry event duration information, or entry event order information.

In step 302, the entry indication is compared to a set of authorized persons. The set of authorized persons may be one authorized person or multiple authorized persons.

The entry identity may be compared to the set of the authorized persons. If the entry identity matches one authorized person in the set of authorized persons, the method branches to step 307. If the entry identity does not match any person in the set of authorized persons, or if the match does not fall within a match process range or tolerance, the method proceeds to step 303.

In step 303, a behavior sequence is selected by the method from a plurality of available behavior sequences included in a behavior model corresponding to the controlled-access area. The selected behavior sequence identifies a predefined verification action. The selected behavior sequence also identifies a verification prompt to be conveyed to the entrant. The verification prompt is sent to a device or devices in the controlled-access area. The verification prompt indicates the entrant should perform a predefined verification action (such as through using such one or more predetermined devices in the controlled-access area) in order to verify the authorization of the entrant to be present in the controlled-access area.

The predefined verification action comprises a sequence of actions that must be performed within a predetermined verification period in order to verify that the entrant is an authorized person. Alternatively, the predefined verification action comprises a sequence and order of actions that are performed within the predetermined verification period. In yet another alternative, the predefined verification action comprises a sequence, duration, and order of actions that are performed within the predetermined verification period.

In some embodiments, the predetermined verification action sequence comprises predefined actions in a predefined sequence including predefined durations of the actions (i.e., pressing and holding a doorbell button for at least four second, for example). The verification prompt may be known by an authorized person or persons, wherein an entrant who is authorized will understand what verification action or actions to perform, in what sequence, in order to verify his or her identity and authorization status.

The verification prompt may not be a clear and unambiguous direction about the entrant performing the predefined verification action. In some embodiments, the verification prompt comprises a visual or audio prompt that an authorized person would recognize, such as a specific change in lighting level, or alternatively an audio beep, tone, or sound sequence issuing from an alarm device or other audio generating device. The predefined verification action is known to the set of authorized persons, such as during setup of the intruder detection system 100 or during a learning phase.

The intruder detection system accesses a behavior model corresponding to the controlled-access area. The behavior model includes a plurality of behavior sequences for authorized persons in the controlled-access area. Each behavior sequence of the plurality of behavior sequences corresponds to at least one behavior parameter of the behavior model, such as an entry time, an entry location, a verification prompt to be sent to a device or devices within the controlled-access area, an end event parameter, a disturbance score parameter, a detectability score parameter, or behavior sequence parameter, or others.

The entry indication is compared to the behavior model in an attempt to match the entry indication to a sequence of actions stored in the behavior model. The best match of the entry indication to a sequence of actions is determined (i.e., the entry action is compared to known and stored typical actions of an authorized person or persons who are authorized to be in the controlled-access area). A matching score is generated as a result of the comparison between the entry indication and the behavior parameters of the behavior model, with matching scores being generated for all relevant behavior parameters. Consequently, a matching score is generated for each behavior sequence of the plurality of behavior sequences. A behavior sequence having a highest matching score may be selected by the method. A verification prompt is obtained from the selected behavior sequence, with the verification prompt indicating to the entrant the verification actions that should be performed by the entrant in order to verify the identity of the entrant. The selected behavior sequence corresponds to the verification prompt sent to the device in the controlled-access area.

Step 303 can include three distinct actions: 1) comparing the entry indication to parameters of the behavior model, 2) determining a closest match between the entry indication and parameters of a particular behavior sequence within the behavior model, and 3) selecting a best behavior sequence to use as the verification action, based on the closest match.

If two or more behavior sequences have identical matching scores, then additional steps may be performed before selecting the behavior sequence. The behavior model further comprises a disturbance score parameter. Consequently, disturbance scores can be generated for each behavior sequence. If there are at least two behavior sequences which share the highest matching score, the behavior sequence corresponding to the highest disturbance score is selected.

In step 304, entrant behavior information is received, with the entrant behavior information being generated by one or more devices in the controlled-access area. It should be understood that the entrant behavior information may or may not have been received before the sending of the verification prompt. In some embodiments, the entrant behavior information is received only after the verification prompt has been sent, with the verification prompt being sent to the detection server along with being sent to the plurality of devices in the controlled-access area. Alternatively, in other embodiments such entrant behavior information was been received prior to sending the verification prompt, and the method begins monitoring the entrant behavior information as part of the entrant verification process. It should be understood that in this second embodiment, this can include examining entrant behavior information that was received before the verification prompt was sent to the device in the controlled-access area.

In a first example, the entrant behavior information is received from the time the entry occurs until an end event is encountered, or until an expiration of a verification period (i.e., the verification period end). In a second example, the entrant behavior information is received only after the verification prompt is sent and is received until either the end event is encountered or until the verification period end.

In step 305, the entrant behavior information is compared to the behavior model and a behavior comparison value is generated. The behavior model includes the verification prompt and corresponds to one or both of the controlled-access area or to the set of authorized persons. The behavior model includes one or more behavior sequences. The behavior model can include one or more sequences for each authorized person in the set of authorized persons.

In step 306, the behavior comparison value is compared to an alarm threshold and a behavior comparison value is generated as a result of the comparison. The behavior comparison value in some embodiments comprises a number that quantifies a difference between the entrant behavior information and the behavior model. A low or small behavior comparison value indicates a small difference between the entrant behavior information and the behavior model. A high or large behavior comparison value indicates a large difference between the entrant behavior information and the behavior model and can be used to determine that the entrant is an intruder, wherein the entrant's behavior is judged to be significantly different from the behavior of the set of authorized persons. If the behavior comparison value is smaller than an alarm threshold, the method proceeds to step 307. Otherwise, if the behavior comparison value exceeds the alarm threshold, the method branches to step 308.

In step 307, where the behavior comparison value is smaller than the alarm threshold, the method determines that the entrant is not an intruder, so generates an allowed entry indication or performs other suitable actions. In other examples, the method does not generate an allowed entry indication at the expiration of the verification period, and may execute a predetermined number of retries, or can simply end the verification process.

In step 308, an intruder indication is generated, as the identity of the entrant does not match authorized person behavior and the identity of the entrant cannot therefore be verified. Further, the intruder indication may also be sent to one or more of the UD, the detection server, or can be used to generate an alarm in the intruder detection system. In some embodiments, steps 303 to 306 can be repeated in order to re-verify whether the entrant is an intruder.

As an example, the entrant behavior information is received substantially continually. In some embodiments, the entrant behavior information is received until either an end event is encountered or until an expiration of a verification period. If the verification period expires, then the method proceeds to step 308 and generates the intruder indication, as no match has been found between the entrant behavior information. If, however, a match is found before expiration of the verification period, then the method proceeds to step 307.

In other examples, the entrant behavior information is received before either an end event is encountered or before an expiration of a verification period, and the method proceeds to steps 305 and 306, and then to step 308, to generate the intruder indication, as no match has been found between the entrant behavior information. If, however, a match is found, the method may further perform step 304 to further receive entrant behavior information, and to perform steps 305-306, until the end event is encountered or until the expiration of the verification period, and to perform step 307 to generate an allowed entry indication.

Through the above solution, the method may determine whether the entrant is allowed to be within the controlled-access area, based on the entrant's behavior in response to the verification prompt. The solution therefore improves entrant verification/identity accuracy. In addition, the intruder indication can be sent to the UD and to the home security provider, once the method has determined the person in the home is an intruder.

In some method embodiments, the method generates the intruder indication if the entrant behavior information does not match a behavior sequence included in the behavior model within a predetermined verification period.

In some method embodiments, the entry indication includes an entrant identity obtained during an entry event, with the method further comprising the preliminary steps of comparing the entrant identity to authorized person information of the set of authorized persons, and performing the sending, receiving, comparing, and generating steps if the entrant identity does not match the authorized person information.

In some method embodiments, before sending the verification prompt, the method further comprises selecting the behavior sequence from a plurality of behavior sequences in the behavior model, with the selected behavior sequence corresponding to the predefined verification action. In other method embodiments, before sending the verification prompt, the method further comprises comparing entry location information and entry time information in the entry indication to corresponding behavior parameters of each behavior sequence of a plurality of behavior sequences in the behavior model, generating a matching score for each behavior sequence, and selecting the behavior sequence having a highest matching score from a plurality of behavior sequences in the behavior model, with the selected behavior sequence corresponding to the predefined verification action. In yet other method embodiments, before sending the verification prompt, the method further comprises comparing entry location information and entry time information in the entry indication to corresponding behavior parameters of each behavior sequence of a plurality of behavior sequences in the behavior model, generating a matching score and a disturbance score for each behavior sequence, and selecting the behavior sequence corresponding to the highest matching score or to the highest disturbance score from at least two behavior sequences if the at least two behavior sequences share a highest matching score, with the selected behavior sequence corresponding to the predefined verification action.

Figure 3B:
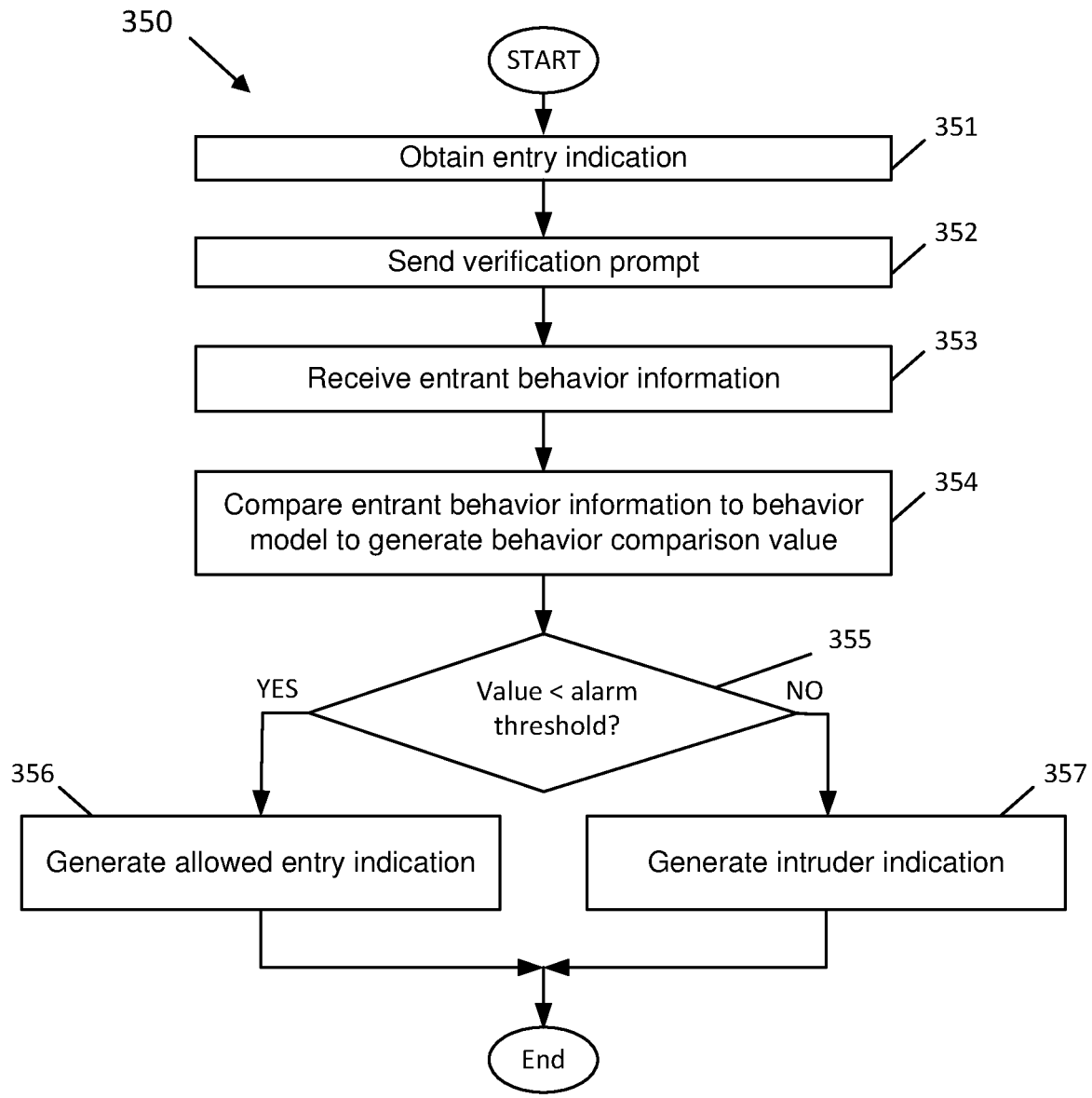
FIG. 3B is a flowchart of an intruder detection method according to an embodiment.

FIG. 3B is a flowchart of an intruder detection method 350 according to an embodiment. The method 350 may be carried out in the context of the security server in some examples.

In step 351, an entry indication is obtained, as previously discussed in step 301 of the method 300.

In step 352, a verification prompt is sent, as previously discussed for step 303.

In step 353, entrant behavior information is received, as previously discussed for step 304.

In step 354, the entrant behavior information is compared to a behavior model, as previously discussed for step 305.

In step 355, the behavior comparison value generated in step 354 is compared to an alarm threshold, as previously discussed for step 306.

In step 356, where the behavior comparison value is smaller than the alarm threshold, an allowed entry indication is generated, as previously discussed for step 307.

In step 357, where the behavior comparison value is larger than the alarm threshold, an intruder indication is generated, as previously discussed for step 308.

The example described in FIG. 3B does not include a step that is equivalent to step 302 of the method 300, which compares the entry indication to a set of authorized persons. The method 350 sends a verification prompt to a device in the controlled-access area once the entry indication has been obtained. The method 350 does not include a step wherein the entry information is compared to authorized person information of a person or persons authorized to be in the controlled-access area. In the method 350, the verification of the entrant behavior is always performed. Therefore, the process performed by the security server is simplified as compared to method 300.

Figure 4:
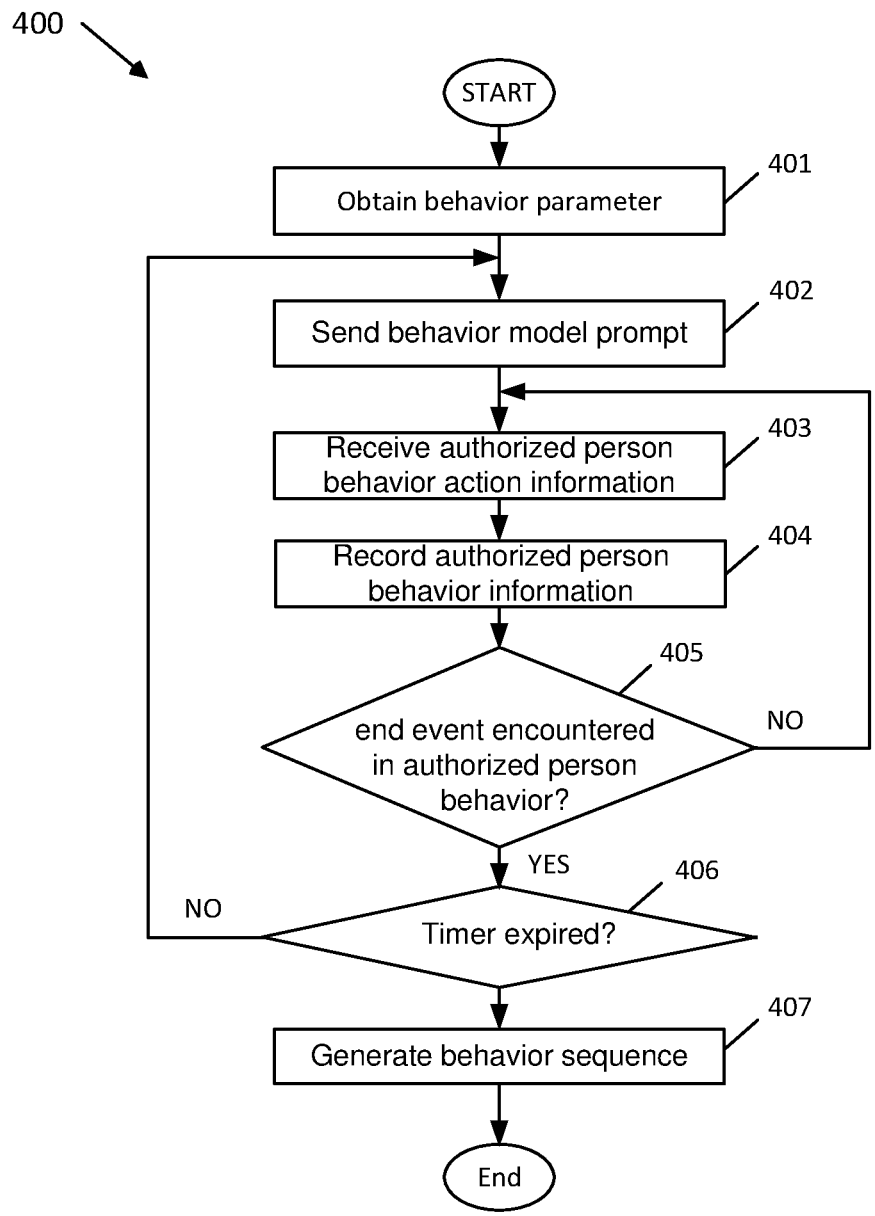
FIG. 4 is a flowchart of a behavior model construction method according to an embodiment.

FIG. 4 is a flowchart of a behavior model construction method 400 according to an embodiment. The method 400 may be carried out by the security server in some examples. The method 400 performs behavior model construction by requiring an authorized person or a set of authorized persons to perform a behavior sequence at least one time (i.e., there is a training or learning phase where occupant behavior is monitored and learned). The method 400 obtains one or more parameters of a behavior model and obtains the behavior sequence corresponding to the one or more parameters to construct the behavior model. The construction process includes requiring the authorized person to perform a sequence of actions corresponding to the behavior model prompt, including performing the sequence of actions multiple times in some examples. The method 400 generates a behavior sequence based on the behavior of the authorized person as captured through sensors or devices located within the controlled-access area.

In step 401, at least one behavior parameter of a behavior model is obtained. The at least one behavior parameter of the behavior model may be obtained by the security server from a service provider. For example, the service provider may specify common behavior parameters to be used in building the behavior model, such as door opening occurrences, door opening durations, expected times of day when door openings will occur (i.e. a door opening at 2 am will be unusual unless the occupant works a night shift, for example). After a user subscribes to a security service of the security provider, the security provider can provide the at least one parameter to the security server. Alternatively, an occupant or authorized person of the controlled-access area may provide at least some of the behavior parameters or may select from a set of possible behavior parameters. The at least one parameter give conditions of normal behavior, and can specify an action sequence of a set of authorized person that can be used to determine between an intruder or an occupant. The at least one behavior parameters comprise, for example, a entry location parameter (such as a room where the user is in), a entry time, a verification prompt to be sent to a device or devices within the controlled-access area, an end event parameter, a disturbance score parameter, a detectability score parameter, or behavior sequence parameter, or others.

The entry location parameter indicates a location of the device sending an entry indication. The entry location may be living room information, bedroom information, kitchen information, bathroom information, or garage information, etc.

The time parameter indicates a time or time range corresponding to an entry. For example, a sensor could report entry time broadly, such as in the morning, around noon, in the afternoon, in the evening. Alternatively, the time could be reported more specifically, such as in the early morning, in 8:00-9:00 am, and so on. Different time ranges may correspond to a same verification prompt. Alternatively, for the same verification prompt, different time range may correspond to different behavior sequence.

An end-event parameter indicates a verification time period or an end event. The end event indicates that the security server may stop receiving authorized person behavior information when the security server encounters the end event for the behavior model prompt during the learning phase or may stop receiving entrant behavior information when the security server encounters the end event corresponding to the verification prompt during the verification process. The verification time period indicates that the security server may stop receiving the authorized person behavior information when the verification time is expired during the learning phase, or the security server may stop receiving the authorized person behavior information when the verification time is expired during the verification process. The verification time may be started once the entry is occurred, or the verification time may be started once the verification prompt is sent. The end event may be that the smoke alarm is reset, the door is opened, the phone is picked up, the TV is turned off, etc.

In step 402, a behavior model prompt is sent to the device in the controlled-access area. In some embodiments, the behavior model prompt is sent via the detection server. The behavior model prompt indicates the authorized person should perform a specified action.

The behavior model includes at least one behavior model prompt that may be selected and performed to the entrant. Each behavior model prompt indicates a time range for sending the behavior model prompt. Each behavior prompt may further correspond to a location of the device sending the entry indication, and so on. The selection for the behavior model prompt may be based on the time range and/or the location of the device in the controlled-access area. The behavior model parameter in the learning process of a behavior model construction method may be also named as the verification prompt parameter in the verification process.

Before the behavior model prompt is sent, the security server subscribes to a status of the authorized person information from the detection server, to obtain a status notification when the authorized person is in the controlled-access area. The security server may send the behavior model prompt to the device after receiving the status notification from the detection server.

In step 403, authorized person behavior information is received, with the authorized person behavior information generally being received in response to the behavior model prompt.

In step 404, the authorized person behavior action information is recorded.

In step 405, the method determines whether an end event has been encountered in the authorized person behavior information. If the end event has been encountered, the method branches to step 406. If the end event is not encountered in the authorized person behavior information, the method repeats steps 402-406 to continually receive the authorized person behavior information.

The security server will receive and record the authorized person behavior information until the end event is encountered or the verification time period has expired.

The security server may send a stop command to the detection server after encountering the end event or after the verification time period is expired.

In step 406, the method determines whether a learning process timer has expired. If the learning process timer has expired, the method branches to step 407. If the timer of a learning phase is not expired, the method branches back to step 402.

The learning process timer may be set by the security server based on the training instruction parameter, after the security server obtains the at least one behavior parameter. The learning process timer indicates the time period for accumulating authorized person behavior information multiple times during the learning phase, including multiple training actions or sessions.

In other example, the security server may set a counter for each verification prompt in each time range. The counter initially indicates a number of times the behavior model prompt should be sent in order to prompt the receipt of authorized person behavior action information in each time range. The security server determines whether the times of sending the behavior model prompt equals to the indication number of the counter. If the times of sending the behavior model prompt equals to the indication number of the counter, the method performs step 407, or the method performs step 402.

In step 407, a behavior sequence for each verification prompt in each time range and each location is generated. After accumulating authorized person behavior action information during the learning phase, the security server recognizes behavior patterns in the accumulated authorized person behavior actions. The security server generates a behavior sequence for each verification prompt in each time range and each location based on the behavior patterns. The behavior sequence of the one or more behavior sequences comprising a sequence of expected behavior actions performed by the set of authorized persons.

In other examples, the behavior sequence may be removed by the security server if the behavior sequence unacceptably deviates from the one or more authorized person behavior action. In other examples, the behavior sequence may also be removed after the security server determines that the behavior sequence is difficult to differentiate from a behavior of an intruder.

Through the above solution, the security server may generate one or more behavior sequences for the behavior model. Each behavior sequence corresponds to a combination of the verification prompt, time information or the location information of the behavior parameter specified in the behavior model. As a result, the security server may determine whether the entrant is an intruder based on the behavior sequence and the entrant behavior information in response to the verification prompt.

Figure 5:
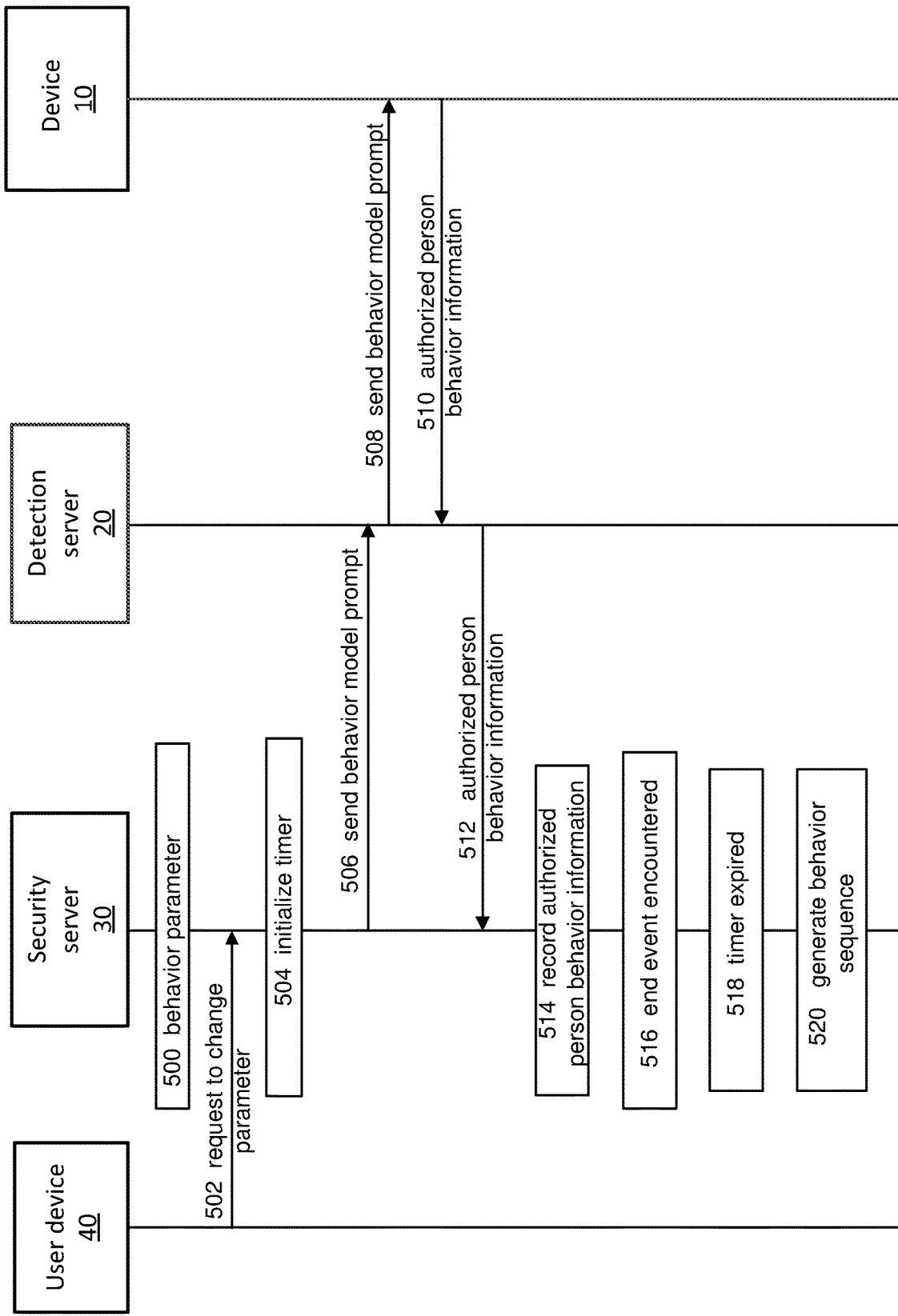
FIG. 5 is a signal flow diagram of a behavior model construction method according to an embodiment.

FIG. 5 is a signal flow diagram of a behavior model construction method according to an embodiment. The method may be carried out by the device 10, detection server 20, the security server 30, and the UD 40, in some examples. The method 500 performs behavior model construction by requiring a person or set of authorized persons to perform a behavior sequence at least one time. The method 500 obtains one or more parameters of a behavior model and obtains the behavior sequence corresponding to the one or more parameters to construct the behavior model. The construction process includes requiring the authorized person to perform one or more times of a sequence of actions corresponding to the behavior model prompt. The method 500 generates a behavior sequence based on the one or more times behavior of the authorized person.

In step 500, the home security server 30 obtains at least one behavior parameter of a behavior model from a home security provider, as previously discussed.

The security server 30 may also obtain a training instruction parameter from the security service provider. The training instruction parameter may be a training time period which instructs a time period for accumulating authorized person behavior action information during the learning phase from the devices 10 to generate a behavior sequence. The time period for training may be named a training period, such as a month, ten days and so on. In the training period, the home security server may receive authorized person behavior action information from one or more devices via the detection server 20 multiple times. The security server 30 generates a behavior sequence for each verification prompt in each time range and each location. The training instruction parameter may also be a number of currency to instruct how many times of behavior model prompt should be sent to receive authorized person behavior action information.

In step 502, the UD 40 requests to change the one or more parameters of the behavior model. After the user subscribes the security service from the security provider, the user may install a security application (app) in the UD 40. The security server 30 obtains the behavior parameters of the behavior model from the security provider, and the user may browse each behavior parameter via the home security app installed in the UD 40. The user may request to change the behavior parameters via sending a changing the behavior parameters request to the security server 30. The user may also change the parameters via an interface of the security server 30.

For example, the user may change a time parameter, such as 2:00-3:00 am for a doorbell ring. The user may also change the end event parameter, such as changes the 20 seconds to 10 seconds and so on. The user may also cancel one or more time parameters or cancel one or more verification prompt. In other examples, the security provider may also update the one or more behavior parameters of the behavior model and send the updated one or more behavior parameters to the security server 30. The security provider may also provide behavior parameters for a new verification prompt to the security server 30. In addition, the user may further change the training instruction parameter via the UD 40.

In step 504, the security server 30 initializes a timer based on the training instruction parameter.

After receiving the behavior parameter and the training instruction parameter, the security server 30 may initialize the timer for accumulating the authorized person behavior action information during the learning phase instructed by the training instruction parameter, such as a month, ten days and so on.

In another example, the timer may be a counter. In Step 504, the security server initializes a counter to record the times of accumulating the authorized person behavior action information during the learning phase.

In step 504, the security server 30 sends a behavior model prompt to the detection server 20. The behavior model prompt indicates the authorized person to perform a specified authorized person behavior action.

The behavior model includes at least one verification prompt. Each verification prompt indicates the time range sent to the device 10, the user location and so on. The security server 30 sends the behavior model prompt to the device 10 based on the behavior parameter specified in the behavior model. The behavior model prompt may be a same prompt as the verification prompt.

Before the security server 30 sends a behavior prompt, the security server 30 subscribes to a status notification of the authorized person from the detection server 20, to obtain the status notification of the authorized person when the authorized person is in the controlled-access area 13. The security server 30 may sends the behavior model prompt to the device 10 after receiving the status notification from the detection server 20, with the status notification indicating that the authorized person is in the controlled-access area 13.

In step 508, the detection server 20 sends the behavior model prompt to the device 10, so that the device 10 notifies the behavior model prompt to the authorized person in the controlled-access area 13. For example, if the behavior model prompt is an audio for request the authorized person to do something, the device 10 plays the audio. If the verification prompt is alarming a doorbell ring, or alarming the fire sensor, the doorbell will ring after receiving the behavior model prompt, or the fire sensor will alarm after receiving the behavior model prompt. The behavior model prompt comprises a visual or audio prompt that the authorized person would recognize, such as a specific change in lighting level, an audio beep, tone, or sound sequence issuing from an alarm device or other audio generating device.

In step 510, the device 10 in the controlled-access area 13 sends the authorized person behavior action information to the detection server 20. The authorized person behavior action information may be any information monitored by the one or more devices 10. The device 10 sending the authorized person behavior action information may be the same as the device 10 receiving the behavior model prompt or may be different from the device 10 receiving the behavior model prompt. The device 10 sending the authorized person behavior action information may be one device or may be multiple devices 10 monitoring the authorized person behavior action.

In other example, except sending the authorized person behavior action information, the one or more devices 10 may further send authorized person location information, authorized person information to the detection server 20. The authorized person location information may be room information, such as bedroom information, living room information, kitchen information, and so on. The authorized person information may be the authorized person identifier, authorized person face information detected by a camera, authorized person fingerprint information detected by a fingerprint device, or voice information detected by a voice recognition device, and so on. For example, the device 10 sends a door opening information to the detection server 20 after a doorbell rings. The location information is the bedroom information indicating that the authorized person is in the bedroom when the doorbell is ringing, the time information is 10:08 am, and the verification prompt parameter is the doorbell ring. In addition, the authorized person information may be the authorized face information, voice information, and so on.

In step 512, the detection server 20 sends the authorized person behavior action information to the security server 30. After the detection server 30 receives the authorized person behavior information, the detection server 20 determines that the security server 30 should send a behavior model prompt, and the detection server 20 sends the authorized person behavior action information to the security server 30. For example, the behavior model prompt may further include the end-event parameter indicating the verification time period, the detection server 30 will stop sending the authorized person behavior action information to the security server 30 once the verification time period has expired. In other example, the detection server 30 will continually send the authorized person behavior action information to the security server 30 based on the behavior model prompt until receiving a stop sending notification from the security server 30.

In step 514, the security server 30 records the authorized person behavior action information. After receiving the authorized person behavior action information, the security server 30 records the authored person behavior action information. The security server 30 may record the authored person behavior action information in the security server 30 or may record the authored person behavior action information in a cloud server (not shown).

In step 516, the security server 30 determines whether an end event has been encountered in the authorized person behavior information. If the end event has been encountered in the authorized person behavior information, the security server 30 performs step 518, or the security server 30 performs steps 510-514 to continually receive the authorized person behavior information.

The security server 30 will receive and record the authorized person behavior information until encountering an end event corresponding to the behavior model prompt, or until the time period for receiving the authorized person behavior information has expired, based on the end event parameter of the behavior model, with the value of the end event parameter corresponding to the behavior model prompt sent to the device 10. The security server 30 may also send a stop command to the detection server 20 after encountering the end event or after the time period has expired.

In step 518, the security server 30 determines whether a learning process timer has expired. If the learning process timer has expired, the security server 30 performs step 520. Otherwise, the security server 30 branches to step 402.

The timer may be set by the security server 30 based on the training instruction parameter, after the security server 30 obtains the behavior parameters. The timer indicates the time for accumulating multiple authorized person behavior information during a learning phase.

In other example, the security server 30 may also set a counter for each behavior model prompt in each time range, the counter initially indicating a number of times that the behavior model prompt should be sent in order to prompt authorized person behavior action information in each time range. The security server 30 determines whether the times of sending the behavior model prompt equals to the indication number of the counter. If the times of sending the behavior model prompt equals to the indication number of the counter, the security server performs step 520, or the security server 30 performs step 506.

In step 520, the security server 30 generates a behavior sequence for each verification prompt in each time range and each location. After accumulating authorized person behavior action information during the learning phase, the security server 30 recognizes behavior patterns in the accumulated authorized person behavior actions. The security server 30 generates a behavior sequence for each verification prompt in each time range and each location based on the behavior patterns. The behavior sequence of the one or more behavior sequences comprising a sequence of expected behavior actions performed by the set of authorized persons.

The user behavior model may be referred to table 1.

behavior parameters may be the verification prompt parameter which is also the behavior model prompt parameter. Therefore, the detection server 20 may determine whether the authorized person behavior action information is responsive to a certain event corresponding to the behavior prompt parameter, such as a doorbell ring or a smoke detector alarm. In other examples, the one or more behavior parameters may also include the end event parameter. The detection server 20 may send the authorized person behavior action information to the security server 30 until it encounters the end events instructed by the end event parameter.

In the above described process performed by the detection server 20, the detection server 20 sends the authorized person behavior action information to the security server 30 based on the subscription request, which may simplify the

| Location parameter | Verification (or behavior model) prompt parameter | Time parameter | End event parameter | Score C | Score D | behavior sequence |
|---|---|---|---|---|---|---|
| bedroom | Doorbell ring | 12:00 pm-1:00 am | 20 seconds or the door is opened | 80 | 60 | Turn on the light, watch the door condition, open the door |
|  | smoke detector alarm | 10:00 am-12:00 am | 20 seconds or the smoke detector is reset | 80 | 60 | Check the kitchen room, call fire phone or reset the |
|  | Doorbell ring | 10:00 am-12:00 am | 20 seconds or the smoke detector is reset | 70 | 50 | watch the door condition, open the door |
| Living room | smoke detector alarm | 10:00 am-11:00 am | 20 seconds or the smoke detector is reset | 80 | 60 | Check the kitchen room, call fire phone or reset the smoke detector alarm |
| Bed room | Phone call | 2:00 pm-3:00 pm | 10 seconds or the smoke detector is answered | 60 | 60 | Stop the phone ring or answer the phone |

In the above description, the security server 30 generates different behavior sequences for different verification processes in different time periods, and at different locations. The security server 30 may determine whether the entrant is an intruder or an authorized person via analyzing the entrant behavior responding to the verification prompt based on the behavior sequence of the behavior model.

In the above example, the security server 30 sends the behavior model prompt to the device via the detection server 20. In other examples, the security server 30 does not send the behavior model prompt to the detection server 20 and sends a subscription request to the detection server 20 to subscribe current authorized person behavior action information from the one or more device 10. The subscription request includes one or more parameters of the behavior model. After the detection server 20 receives the authorized person behavior action information, the detection server 20 determines whether the authorized person behavior action information is subscribed by the security server 30 based on the one or more parameters in the subscription request. If the detection server 20 determines that the authorized person behavior action information is subscribed by the security server 30, the detection server 20 sends the authorized person behavior action information to the security server 30.

The detection server 20 may receive any information from the one or more devices 10 at any time. The one or more process of the security server, the behavior model prompt will not send to the device for each time. Therefore, network resources may be conserved.

In other examples, the behavior sequence may be removed by the security server if the behavior sequence has much difference from the one or more authorized person behavior action. For example, if the accumulated authorized person behavior information corresponding to the same time range and same location and the same behavior model prompt is different, the generated behavior sequence may be too different from the authorized person behavior. This behavior sequence may be removed from the behavior model. In other examples, the behavior sequence may also be removed after the security server determines that the behavior sequence is difficult to differentiate from a behavior of an intruder.

Figure 6:
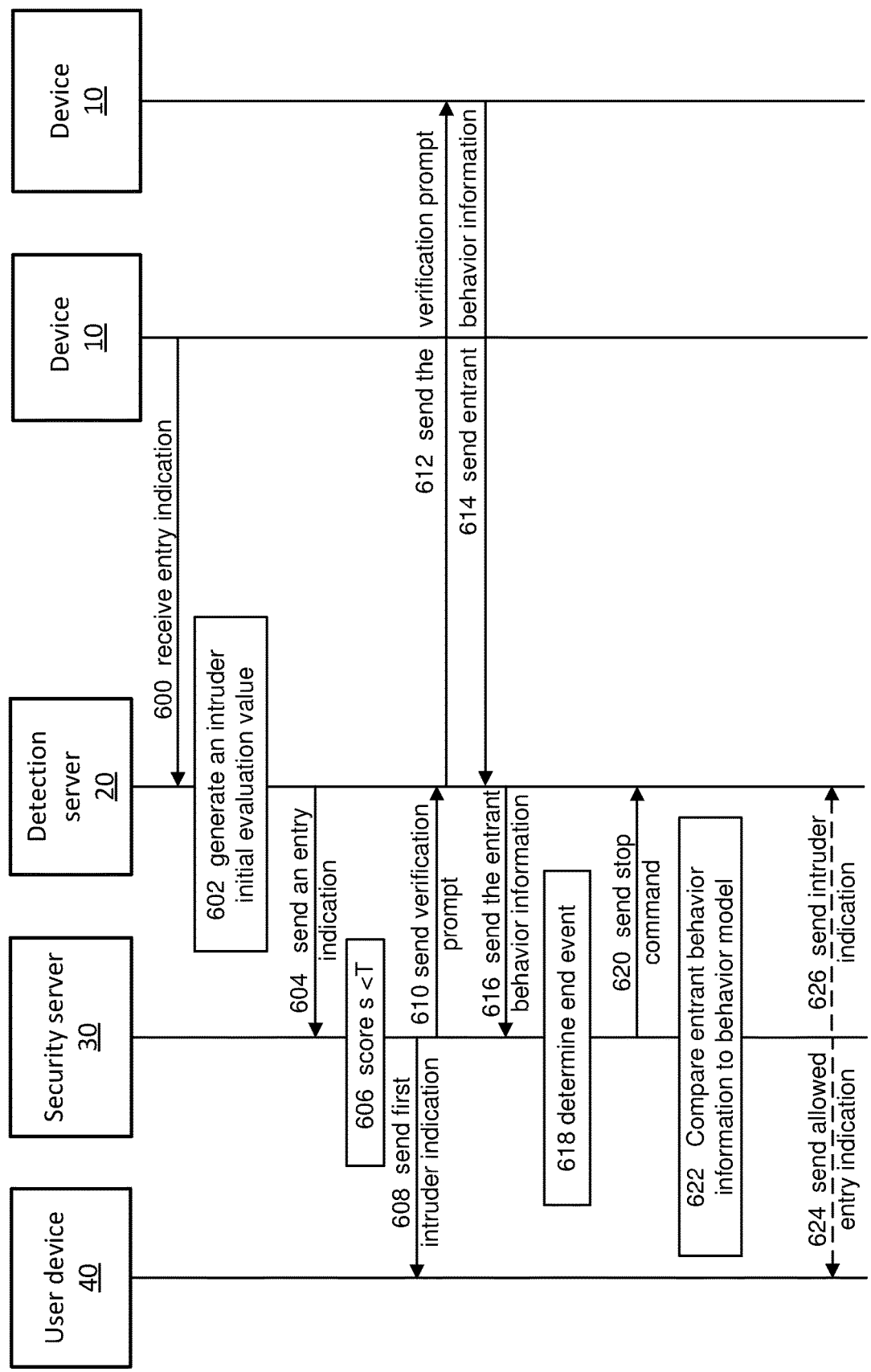
FIG. 6 is a signal flow diagram of an intruder detection method according to an embodiment.

FIG. 6 is a signal flow diagram of an intruder detection method according to an embodiment. The method may be carried out by the device 10, detection server 20, the security server 30, and/or the UD 40, in some examples. The method performs in intruder detection by requiring an entrant to perform a verification process. The method generated an intruder indication if the entrant does not perform the prompted verification process or if the entrant fails to correctly perform the prompted verification process. The verification process includes requiring the entrant to perform a predetermined sequence of actions to verify whether the entrant is authorized to enter the controlled-access area 13. The predetermined behavior sequence comprises normal and regular actions performed by an authorized person or persons. The method determines whether the entrant is authorized or an intruder by comparing the actions of the entrant, in response to the verification prompt, and determining if the entrant's behavior sufficiently matches the behavior of the authorized person or persons. The intruder indication can be used to perform additional security actions, including triggering alarms, locking doors, and notifying law enforcement personnel, among others.

In step 600, the detection server 20 receives an entry indication from a device 10 during an entry event.

The entry indication typically indicates that a person or persons (i.e., the "entrant") has entered the controlled-access area 13. The entry indication includes entrant identity obtained during an entry event. The entry indication may also include one or more of entry action information, entry location information, entry time information, entry event duration information, or entry event order information.

In step 602, the detection server 20 generates an intruder initial evaluation value based on the entrant indication.

The detection server 20 matches the entrant indication to the authorized person information to generate an intruder initial evaluation value information. The detection server 20 stores a potential intruder threshold, determines whether the entrant is a potential intruder based on the intruder initial evaluation value and on the potential intruder threshold. If the intruder initial evaluation value is larger than the potential intruder threshold, the detection server 20 may determine that the entrant is a potential intruder, and the method performs step 604.

In other example, the detection server 20 may further set an authorized person threshold, if the intruder initial evaluation value is smaller than the authorized person threshold, the detection server 20 determines that the entrance is an authorized person, and the method does not perform following steps of the verification process. If the detection server stores multiple authorized person information, the detection server may match the entrant indication to the authorized person information of each of the multiple authorized person.

As an example, the detection server 20 receives the entrant indication with an entrant face information at 10:35 in the morning. The detection serve 20 compares the entrant face information with the face information of authorized person. The intruder initial evaluation value is 5%. The authorized person threshold is 10%. The detection server 20 determines that the entrant is the authorized person. In another example, the intruder initial evaluation value is 60%, and the intruder threshold is 30%, the detection server 20 determines that the entrant is an intruder. The detection server 20 sends an intruder indication to the UD 40 base on the policy set in the detection server 20.

In this example, the intruder initial evaluation value is 20% which is between the authorized person threshold and the potential intruder threshold, the detection server 20 sends the entry indication to the security server 30. As other example, the detection server 20 also sends the intruder initial evaluation value and the entry indication to the security server 30.

In some example, the detection server 20 does not perform step 602, and performs step 604 directly after step 600. The security server 30 does not perform steps 606 and 608 if no intruder initial evaluation value is carried in the entry indication and performs step 610 directly once receiving the entry indication from the detection server 20.

In other example, after performing step 602, and the detection server server performs step 604 directly no matter how much the intruder initial evaluation value. With the intruder initial evaluation value and the entry indication being sent to the security server 30 in the step 604.

In step 604, the detection server 20 sends the entry indication to the security server 30.

As an example, the intruder initial evaluation value is 20% which is between the authorized person threshold and the potential intruder threshold, the detection server 20 sends the entry indication and the intruder initial evaluation value to the security server 30. An intruder indication type may be further sent to the security server 30.

The location information indicates the entrant location when the event is detected. The location information may be living room information, bedroom information, kitchen information, bathroom information, garage information, etc.

The intruder indication type: the method for determining the potential intruder, e.g., a face recognition failure, a fingerprint verification failure, a door is opened at wrong time or without proper verification, motion detected in the controlled-access area during an "Away" mode, or an observed behavior does not match the expected behavior, etc.

The intruder initial evaluation value indicates a result of comparing the entry indication with the authorized person information via a set algorithm. For example, if an alarm is sent because the face recognition system can only find 80% similarity between the entrant and the authorized person, the intruder initial evaluation value may be 0.2. Or if a user opens a door using a Bluetooth device but his behavior after entering the controlled-access area 13 is only 60% matching to the expected behavior, the intruder initial evaluation value may be 0.4, etc.

The authorized person identifier is an identifier of the authorized person whose information is used to compare the entrant identity. The authorized person identifier is an optional parameter. For example, a face recognition system of the detection server 40 detects 80% similarity between the entrant identity and the authorized person information.

In step 606, the security server 30 compares the intruder initial evaluation value with a pre-defined intruder threshold T, and if the intruder initial evaluation value is larger than the predefined intruder threshold T, the security server 30 performs step 608. If the intruder initial evaluation value is smaller than the predefined intruder threshold T, the security server 30 performs the step 610 to send a verification prompt to the detection server 20.

In step 608, the security server 30 sends a first intruder indication to the UD 40.

The security server 30 may further send the first intruder indication to the security server provider (not shown in FIG.s) or a police server (not shown in FIG.s) based on the policy set in the security server 30.

In step 610, the security server 30 sends a verification prompt to the detection server 20. The verification prompt indicates the entrant to perform a predefined verification action.

Before the security server 30 sends the verification prompt to the detection server 20, the security server 30 selects a behavior sequence from a plurality of behavior sequences included in a behavior model, with the selected behavior sequence identifying to the predefined verification action. The selected behavior sequence corresponds to a verification prompt.

The entry indication includes one or more of entry action information, entry location information, entry time information, or entry event duration information, entry event order information. The security server 30 selects the behavior sequence may include: the security server 30 compare one or more of the entry location information, the entry time information, entry action information, entry event duration information, entry order information in the entry indication to the corresponding behavior parameters of each behavior sequence of a plurality of behavior sequences, generates a matching score for each of the plurality of behavior sequences. The security server 30 selects the behavior sequence having a highest matching score, with the selected behavior sequence corresponding to the confirmation prompt sent to the device 10.

If two or more behavior sequences have identical matching scores, then additional steps may be performed before selecting the behavior sequence. The behavior model further comprises a disturbance score parameter. Each behavior sequence corresponds to a disturbance score. If there are at least two behavior sequences which share the highest matching score, the behavior sequence corresponding to the highest disturbance score is selected.

For example, the entry indication comprises the bed room as the location information, the intruder indication type is face recognition failure, and the time is 10:35. Based on the information in the entry indication, the security server 30 determines that information in the entrant indication corresponds to parameters of smoke detector alarm and doorbell ring. The smoke detector alarm with a higher matching score. The security server 30 selects smoke detector alarm as the verification prompt sent to the device 10. The verification prompt includes the verification prompt parameter of smoke detector alarm. The security server 30 sends the verification prompt including a smoke detector alarm command to the detection server 20.

As other example, if the security server 30 determines that at least two behavior sequences with the highest matching score share a same disturbance score (score C), the security server 30 will select the behavior sequence with highest detection score from the at least two behavior sequences to send the verification command to the smart home server 40.

In step 612, the detection server 20 sends the verification prompt to the device 10.

In some example, the device 10 sending the entrant indication may be the same device 10 receiving the verification prompt or may be a different device 10 receiving the verification prompt.

After the detection server 20 receives the verification prompt from the security server 30, the detection server 20 sends the verification prompt to the device 10.

In step 614, the detection server 20 receives entrant behavior information from at least one of the devices 10 in the controlled-access area 13.

The entrant behavior information being generated by one or more devices in the controlled-access area 13. For example, if the verification command is sent to the doorbell and triggers the doorbell ring, the entrant behavior information may be that the light in the bedroom is turned on by the entrant, or the window is opened, or the door is opened, and so on.

The entrant behavior information may be sent by one or more devices 10 during the verification period.

In step 616, the detection server 20 sends the entrant behavior information to the security server 30.

It should be understood that the entrant behavior information may or may not have been sent to the security server 30 before the security server 30 sends the verification prompt. In some embodiments, the entrant behavior information is received from the detection server 20 only after the verification prompt has been sent, with the verification prompt being sent to the detection server 20 along with prompt being sent to the plurality of devices 10. Alternatively, in other embodiments such entrant behavior information was been received prior to sending the verification prompt, and the method now begins monitoring the entrant behavior information as part of the entrant verification process. It should be understood that in this second embodiment, this can include the method examining entrant behavior information that was received before the verification prompt was sent by the security server 30.

Steps from 614 to 616 may be repeated until the detection server 20 receives a stop command from the security server 30.

Before sending the entrant behavior information to the security server 30, the detection server 20 determines that no stop command is received from the security server after receiving the verification prompt.

In step 618, the security server 30 determines that an end event is encountered in the received the entrant behavior information.

The security server 30 receives the entrant behavior information continually until an end event is encountered or until an expiration of a verification period.

The end event corresponding to the smoke detector alarm may be that the 20 seconds is reached, or the smoke detector alarm is reset.

In step 620, the security server 30 sends a stop command to the detection server 20 to instruct the detection server 20 to stop sending further entrant behavior information to the security server 30 based on the verification command.

After the detection server 20 receives the stop command from the security server 30, the detection server 20 stops sending the entrant behavior information continually, until the detection server 20 receives a next entry indication from the device 10 or receives a next verification prompt from security server 30.

In step 622, the security server 30 compares the entrant behavior information to a behavior model of a set of authorized persons associated with the controlled-access area 13 to generate a behavior comparison value. The security server 30 compares the entrant behavior information to the behavior sequence in the behavior model to generate a behavior comparison result S1. The algorithm to compare the entrant behavior information and the expected behavior specified by behavior sequence is set in the security server 30 by the security provider 30. For example, the algorithm may be a different tree, a HMM, a neuron network, etc.

After determining whether the behavior comparison value is smaller than an alarm threshold. If the behavior comparison value is smaller than an alarm threshold, the security server 30 performs step 626. If the behavior comparison value is not smaller than an alarm threshold, the security server 30 performs step 624.

In step 624, the security server 30 generates and sends an allowed entry indication. In other example, the security server does not generate an allowed entry indication at the expiration of the verification period, and may execute a predetermined number of retries, or can simply end the verification process.

In step 626, the security server 30 generates and sends an intruder indication, as the identity of the entrant does not match authorized person behavior and the identity of the entrant cannot therefore be verified. Further, the intruder indication may also be sent to one or more of the UD 40, the detection server 20, or can be used to generate an alarm in the security system. In other example, the security server may repeat to perform steps 610 to 620 to re-verify whether the entrant is an intruder.

Through the above solution, the security server 30 may determine whether the entrant is the authorized person based on the entrant behavior information, to improve the determination accuracy. In addition, the security server 30 may send the intruder indication to the UD 40 and the home security provider, having determined that the entrant is an intruder.

In other example, the security server 30 and the detection server 20 in FIGS. 1-5 may be combined to be a same server. The functions of the security server 30 and functions of the detection server 20 may be performed by a single server or multiple servers.

Figure 7:
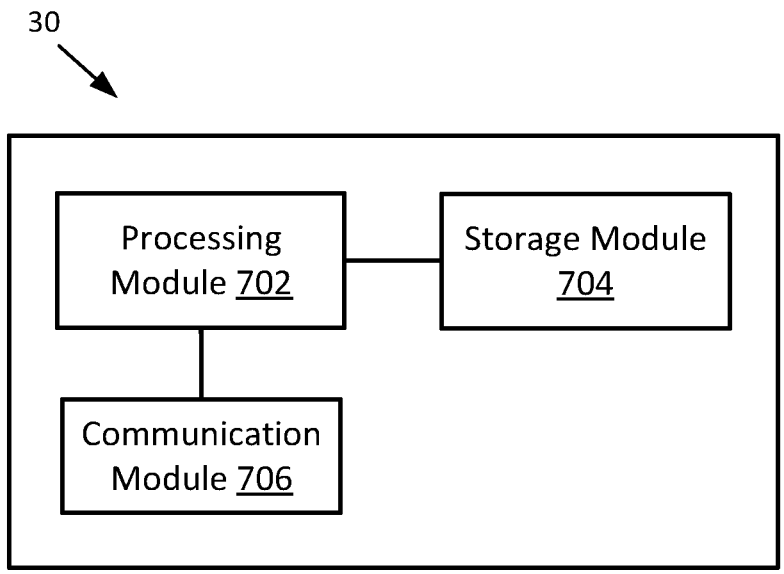
FIG. 7 is a diagram of a security server according to an embodiment.

FIG. 7 is a diagram of a security server 30 according to an embodiment. The security server 30 in the example shown includes a communication module 706, a storage module 704, and a processing module 702.

The communication module 706 is connected to the processing module 702, is configured to communicate with the security provider, the detection server 20, and the UD 40. The communication module 706 is further configured to communicate with the processing module 702. For example, the communication module 702 sends a verification prompt to a device 10, based on an entry indication of an entrant into a controlled-access area, with the verification prompt indicating the entrant to perform a predefined verification action, receive entrant behavior information.

The processing module 702 is connected to the communication module 706 and the storage module 704 respectively. The processing module 702 is configured to compare the entrant behavior information to a behavior model of a set of authorized persons associated with the controlled-access area, with the behavior model including the verification prompt, and generate an intruder indication if the entrant behavior information does not match a behavior sequence included in the behavior model.

After the processing module 702 generates the intruder indication, the communication module 706 may send the intruder indication to the UD 40 or the security provider.

The storage module 704 is connected to the processing module 702. The storage module 704 may store the behavior model and provide information to the processing module 702.

It is understood that except for the above functions, the processing module 702, the storage module 704 and the communication module 706 may also perform the functions of the security server 30 described in any of the embodiments herein.

Any of the processing module 702, the storage module 704 and the communication module 706 maybe embodied in a general-purpose central processing unit (CPU), general processor, digital signal processor (DSP), field programmable gate array (FPGA), application-specific integrated circuit (ASIC), or one or more integrated circuits configured to control the execution of program routines as specified by the present invention. The processing module 702, the storage module 704 and the communication module 706 may also be a combination of computing function, such as a combination including one or more microprocessors, combination including DSP and microprocessors and so on. The communication module 706 may be combined in a transceiver which includes any suitable structure for generating signals for wireless transmission and/or processing signals received wirelessly. And the communication module 706 may receive and send signals from or to (3G, 4G, 5G), Universal Mobile Telecommunications Service (UMTS), Code Division Multiple Access (CDMA), Global System for Mobiles (GMS) etc. network.

Figure 8:
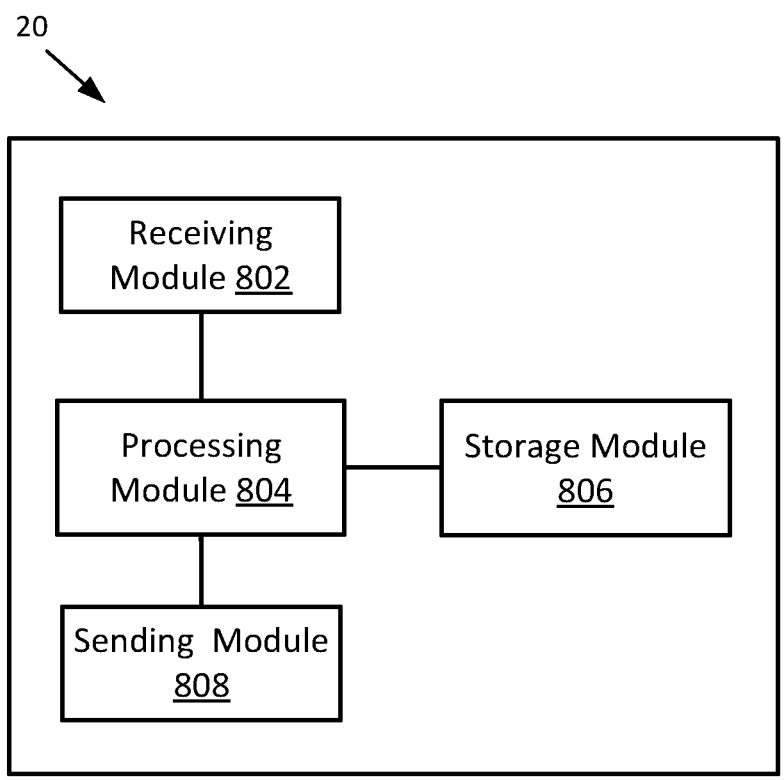
FIG. 8 is a diagram of a detection server according to an embodiment.

FIG. 8 is a diagram of a detection server 20 according to an embodiment. The detection server 20 in the example shown includes a receiving module 802, a processing module 804, a storage module 806 and a sending module 808.

The receiving module 802 is connected to the processing module 804, is configured to communicate with the security server 30, the UD 40, the device 10. The receiving module 802 is further configured to communicate with the processing module 804. For example, the receiving module 802 is configured to receive a verification prompt from a security server, with the verification prompt being based on an entry indication of an entrant into a controlled-access local area, with the verification prompt instructing the entrant to perform a verification action.

The sending module 808 is connected to the processing module 804 and is configured to communicate with the security server 30, the UD 40, and/or the device 10. The sending module 808 is further configured to communicate with the processing module 804. For example, the sending module 808 is configured to send the verification prompt to a device 10.

The receiving module 802 is further configured to receive entrant behavior information, with the entrant behavior information responding to the verification prompt;

The sending module 808 is further configured to send the entrant behavior information to the security server, with the entrant behavior information being used to determine whether the entrant is an intruder.

The processing module 804 is connected to the receiving module 802, the storage module 806, and the sending module 808. The processing module 804 is configured to process information received by the receiving module 802 based on information stored in the storage module 806 and provide the processed information to the sending module 808.

For example, the processing module 804 may matches the entrant identity received by the receiving module 802 to the authorized person information stored in the storage module 806 to generate an intruder initial evaluation value and provide the intruder initial evaluation value to the sending module 808.

The storage module 806 is connected to the processing module 804, may store authorized person information, and provide the authorized person information to the process module 804.

It is understood that except for the above functions, the receiving module 802, the processing module 804, the storage module 806, and the sending module 808 may also perform the functions of the detection server 30 described in any of the embodiments herein.

Any of the receiving module 802, the processing module 804, the storage module 806 and the sending module 808 maybe embodied in a general-purpose central procession unit (CPU), general process, digital signal processor (DSP), field programmable gate array (FPGA), an application-specific integrated circuit (ASIC), or one or more integrated circuits configured to control the execution of program routines as specified by the present invention. The receiving module 802, the processing module 804, the storage module 806 and the sending module 808 may also be a combination of computing functions, such as a combination including one or more microprocessors, combination including DSP and microprocessors and so on. The receiving module 802 and the sending module 808 may be combined in a transceiver which includes any suitable structure for generating signals for wireless transmission and/or processing signals received wirelessly. The receiving module 802 and the sending module 808 may receive and send signals from or to (3G, 4G, 5G), Universal Mobile Telecommunications Service (UMTS), Code Division Multiple Access (CDMA), Global System for Mobiles (GMS) etc. network.

Further examples of the disclosure are listed below though the claims should not be limited to merely what has been illustrated.

What is claimed is:

1. An intruder detection method comprising:
a security server receiving entrant behavior information of an entrant into a controlled-access area;
the security server comparing the entrant behavior information to a behavior model of an authorized person associated with the controlled-access area; and
the security server generating an intruder indication if the entrant behavior information does not match a behavior sequence, corresponding to a verification prompt, included in the behavior model.

2. The method of claim 1, wherein the method includes selecting the behavior sequence from a plurality of behavior sequences in the behavior model, with the selected behavior sequence corresponding to a predefined verification action.

3. The method of claim 1, wherein the method includes:
comparing entry location information and entry time information, received by the security server, to corresponding behavior parameters of each behavior sequence of a plurality of behavior sequences in the behavior model;
generating a matching score for each behavior sequence; and
selecting the behavior sequence having a highest matching score from a plurality of behavior sequences in the behavior model, with the selected behavior sequence corresponding to a predefined verification action.

4. The method of claim 1, wherein the method includes:
comparing entry location information and entry time information, received by the security server, to corresponding behavior parameters of each behavior sequence of a plurality of behavior sequences in the behavior model;
generating a matching score and a disturbance score for each behavior sequence; and
selecting the behavior sequence corresponding to a highest matching score or to a highest disturbance score from at least two behavior sequences if the at least two behavior sequences share a highest matching score, with the selected behavior sequence corresponding to a predefined verification action.

5. The method of claim 1, wherein receiving the entrant behavior information includes receiving the entrant behavior information until encountering an end event in the entrant behavior information or until a verification period end, with the end event specified in the behavior sequence.

6. The method of claim 1, wherein the method includes, in response to comparing the entrant behavior information to the behavior model:
generating a behavior comparison value; and
generating the intruder indication when the behavior comparison value is smaller than an alarm threshold.

7. The method of claim 1, wherein the method includes:
accumulating authorized person behavior information during a learning phase;
recognizing behavior patterns in the accumulated authorized person behavior; and
generating one or more behavior sequences after the learning phase has been completed, with the one or more behavior sequences being generated based on the behavior patterns.

8. The method of claim 7, wherein the method includes obtaining at least one behavior model parameter in the behavior model for each sequence action of a plurality of sequence actions.

9. A security server comprising:
a non-transitory memory comprising instructions; and
one or more processors in communications with the memory, wherein the one or more processors execute the instructions to:
receive entrant behavior information of an entrant into a controlled-access area;
compare the entrant behavior information to a behavior model of an authorized person associated with the controlled-access area; and
generate an intruder indication if the entrant behavior information does not match a behavior sequence, corresponding to a verification prompt, included in the behavior model.

10. The security server of claim 9, wherein the one or more processors execute the instructions to select the behavior sequence from a plurality of behavior sequences in the behavior model, with the selected behavior sequence corresponding to a predefined verification action.

11. The security server of claim 9, wherein the one or more processors execute the instructions to:
compare entry location information and entry time information, received by the security server, to corresponding behavior parameters of each behavior sequence of a plurality of behavior sequences in the behavior model;
generate a matching score for each behavior sequence; and
select the behavior sequence having a highest matching score from a plurality of behavior sequences in the behavior model, with the selected behavior sequence corresponding to a predefined verification action.

12. The security server of claim 9, wherein the one or more processors execute the instructions to:
compare entry location information and entry time information, received by the security server, to corresponding behavior parameters of each behavior sequence of a plurality of behavior sequences in the behavior model;
generate a matching score and a disturbance score for each behavior sequence; and
select the behavior sequence corresponding to a highest matching score or to a highest disturbance score from at least two behavior sequences if the at least two behavior sequences share a highest matching score, with the selected behavior sequence corresponding to a predefined verification action.

13. The security server of claim 9, wherein the instructions to receive the entrant behavior information includes instructions to receive the entrant behavior information until encountering an end event in the entrant behavior information or until a verification period end, with the end event specified in the behavior sequence.

14. The security server of claim 9, wherein the one or more processors, in response to comparing the entrant behavior information to the behavior model, execute the instructions to:
generate a behavior comparison value; and
generate the intruder indication when the behavior comparison value is smaller than an alarm threshold.

15. The security server of claim 9, wherein the one or more processors execute the instructions to:
accumulate authorized person behavior information during a learning phase;
recognize behavior patterns in the accumulated authorized person behavior; and
generate one or more behavior sequences after the learning phase has been completed, with the one or more behavior sequences being generated based on the behavior patterns.

16. The security server of claim 15, wherein the one or more processors execute the instructions to obtain at least one behavior model parameter in the behavior model for each sequence action of a plurality of sequence actions.

17. A non-transitory computer-readable medium storing computer instruction for executing intruder detection, wherein the instructions when executed by one or more processors, cause the one or more processors to perform operations comprising:
receiving, at a security server, entrant behavior information of an entrant into a controlled-access area;
comparing, in the security server, the entrant behavior information to a behavior model of an authorized person associated with the controlled-access area; and
generating, in the security server, an intruder indication if the entrant behavior information does not match a behavior sequence, corresponding to a verification prompt, included in the behavior model.

18. The non-transitory computer-readable medium of claim 17, wherein the operations include selecting the behavior sequence from a plurality of behavior sequences in the behavior model, with the selected behavior sequence corresponding to a predefined verification action.

19. The non-transitory computer-readable medium of claim 17, wherein the operations include:
comparing entry location information and entry time information, received by the security server, to corresponding behavior parameters of each behavior sequence of a plurality of behavior sequences in the behavior model;
generating a matching score and a disturbance score for each behavior sequence; and
selecting the behavior sequence corresponding to a highest matching score or to a highest disturbance score from at least two behavior sequences if the at least two behavior sequences share a highest matching score, with the selected behavior sequence corresponding to a predefined verification action.

20. The non-transitory computer-readable medium of claim 17, wherein the operations include:
accumulating authorized person behavior information during a learning phase;
recognizing behavior patterns in the accumulated authorized person behavior; and
generating one or more behavior sequences after the learning phase has been completed, with the one or more behavior sequences being generated based on the behavior patterns.

\* \* \* \* \*

UNITED STATES PATENT AND TRADEMARK OFFICE
CERTIFICATE OF CORRECTION

PATENT NO. : 11,393,306 B2  
APPLICATION NO. : 17/025770  
DATED : July 19, 2022  
INVENTOR(S) : Wang et al.

Page 1 of 1

It is certified that error appears in the above-identified patent and that said Letters Patent is hereby corrected as shown below:

On the Title Page

Item (71), in "Applicant", in Column 1, Line 3, delete "TX (US)" and insert --(CN)-- therefor On page 2, in Column 1, under "U.S. Patent Documents", Line 3, delete "2020/0000561" and insert --2020/0005610-- therefor Signed and Sealed this  
Twentieth Day of September, 2022

Katherine Kelly Vidal  
*Director of the United States Patent and Trademark Office*